Sept. 15, 1953

J. E. HAWKINS 2,652,558

RADIO LOCATION SYSTEM

Filed Jan. 12, 1950

INVENTOR.
JAMES E. HAWKINS
BY Mason, Kolehmainen, Rathburn & Wyss
ATTORNEYS

Sept. 15, 1953  J. E. HAWKINS  2,652,558
RADIO LOCATION SYSTEM
Filed Jan. 12, 1950  8 Sheets-Sheet 8

INVENTOR.
JAMES E. HAWKINS
BY
Mason, Kolehmainen, Rathburn & Wyss
ATTORNEYS

Patented Sept. 15, 1953

2,652,558

UNITED STATES PATENT OFFICE 2,652,558

RADIO LOCATION SYSTEM

James E. Hawkins, Tulsa, Okla., assignor to Seismograph Service Corporation, Tulsa, Okla., a corporation of Delaware Application January 12, 1950, Serial No. 138,235

49 Claims. (Cl. 343—105)

The present invention relates to radio location and distance determining systems and, although not limited thereto, relates more particularly to improvements in radio position finding systems of the hyperbolic, continuous wave type employing phase comparison in pairs of position indication signals radiated from a plurality of spaced transmitting points to provide one or more indications from which the position of a mobile receiving point relative to the known positions of the transmitting points may be determined without ambiguity and with precision accuracy.

In systems of the particular type referred to, the continuous waves radiated from each pair of transmitters produce standing waves in space, the phase relationship of which changes as a function of changing position between the two transmitting points. More specifically, the standing waves produced by each pair of transmitting units of the system are characterized by iso-phase lines which are hyperbolic in contour about the transmitting points as foci. On a line joining the pair of transmitters, these iso-phase lines are spaced apart a distance equal to one-half of the wavelength of a wave having a frequency equal to the mean or average frequency of the radiated waves, and have diverging spacings at points on either side of this line. With this system arrangement, the position of a receiving point relative to a pair of hyperbolic iso-phase lines may be determined by measuring the phase relationship between continuous waves radiated from the pair of transmitters.

Since the point of location of the receiving point along the zone separating the two iso-phase lines is not indicated by such a phase measurement, it is desirable to employ at least three spaced transmitters, different pairs of which function to provide a grid-like pattern of intersecting hyperbolic lines, in order to obtain absolute determination of the position of the receiving point. Systems of the character described are exceedingly accurate in so far as the position indications produced at the receiving point are concerned. For the system to function, however, it is necessary to maintain phase synchronization between the continuous waves radiated by the spaced transmitters, or alternatively, so to arrange the system that phase shifts between the radiated waves are compensated during the phase comparing operation. Phase synchronization of the waves radiated from the plurality of transmitters presents an exceedingly difficult problem which has been the subject of considerable development work.

To obviate this problem, systems of the continuous wave hyperbolic type have been proposed (see Honore United States Patent No. 2,148,267) in which the phase shift problem is obviated by heterodyning the carrier waves of each pair of transmitters at a fixed link transmitting point, and modulating the difference frequency component of the heterodyned waves as a reference signal upon the carrier output of the link transmitter for radiation to the receiving point, where the difference frequency component is detected and phase compared with a difference frequency signal derived by directly heterodyning the transmitted continuous waves at the receiving point. In this manner, phase shifts between the continuous waves radiated from the two transmitters are completely compensated so that the measured phase angle is truly representative of the location of the receiving point between a pair of iso-phase lines.

While the described arrangement for obviating the phase synchronization problem is entirely satisfactory, another problem encountered in the operation of continuous wave systems is that of eliminating ambiguity from the phase measurements which provide the desired position information. Thus, while the two phase measurements identify the position of the receiving station relative to two intersecting pairs of hyperbolic iso-phase lines, they do not indicate which pairs of lines the indications are related to. This means that in operating the system the geographic location of the receiving system must be known at the start of movement of the receiving system relative to the transmitting stations and, furthermore, that the successive wavelengths must be counted as the receiving station is moved relative to the grid-like pattern of hyperbolic lines. It also means that a mobile craft entering the radiation pattern of the transmitters cannot utilize the radiated signals to determine its position without employing auxiliary equipment to determine the approximate position of the craft relative to the signal transmitters.

It is an object of the invention, therefore, to provide an improved radio location system of the continuous wave type which is free of phase synchronization difficulties of the character mentioned and in which the above mentioned disadvantages pertaining to ambiguity are entirely obviated.

It is another object of the present invention to provide an improved radio location system of the continuous wave type which is free of phase synchronization difficulties and in which certain of the position indications obtained have sensitivities, in so far as the spacing of the iso-phase lines is concerned, which will be referred to hereinafter as phase sensitivity, different from the phase sensitivity normally determined by the frequencies of the radiated waves.

It is a further object of the present invention to provide a radio position finding system of the character described in which non-ambiguous position indications are obtained.

It is a still further object of the invention to provide a radio position finding system of the character described in which a plurality of low phase sensitivity position indications and high phase sensitivity position indications are obtained, the low phase sensitivity indications being effective to locate the range of the high phase sensitivity indications and being characterized by widely spaced phase coincidences, and the high phase sensitivity indications being characterized by closely spaced phase coincidences.

Still another object of the invention is to provide a radio position indicating system of the character described wherein such high phase sensitivity and low phase sensitivity position indications are obtained while employing carrier frequencies suitable for efficient long range propagation.

It is likewise an object of the present invention to provide improved transmission systems for use in radio location systems of the above indicated character.

It is also an object of the invention to provide improved receiving equipment for use in radio location systems of the above indicated character.

The invention, both as to its organization and method of operation, together with further objects and advantages thereof, will best be understood by reference to the specification taken in connection with the accompanying drawings, in which.

Figure 3:
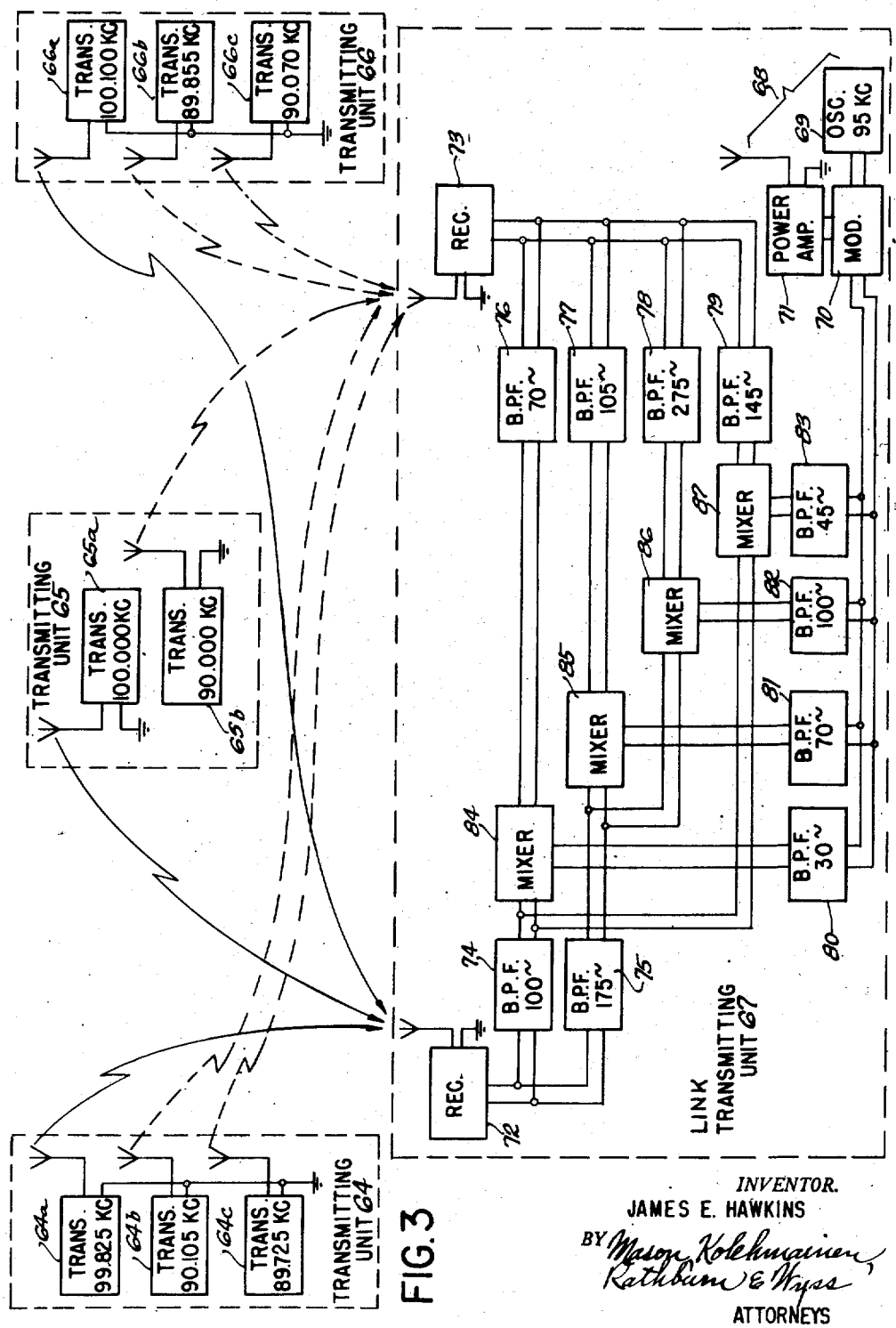
Figure 4:
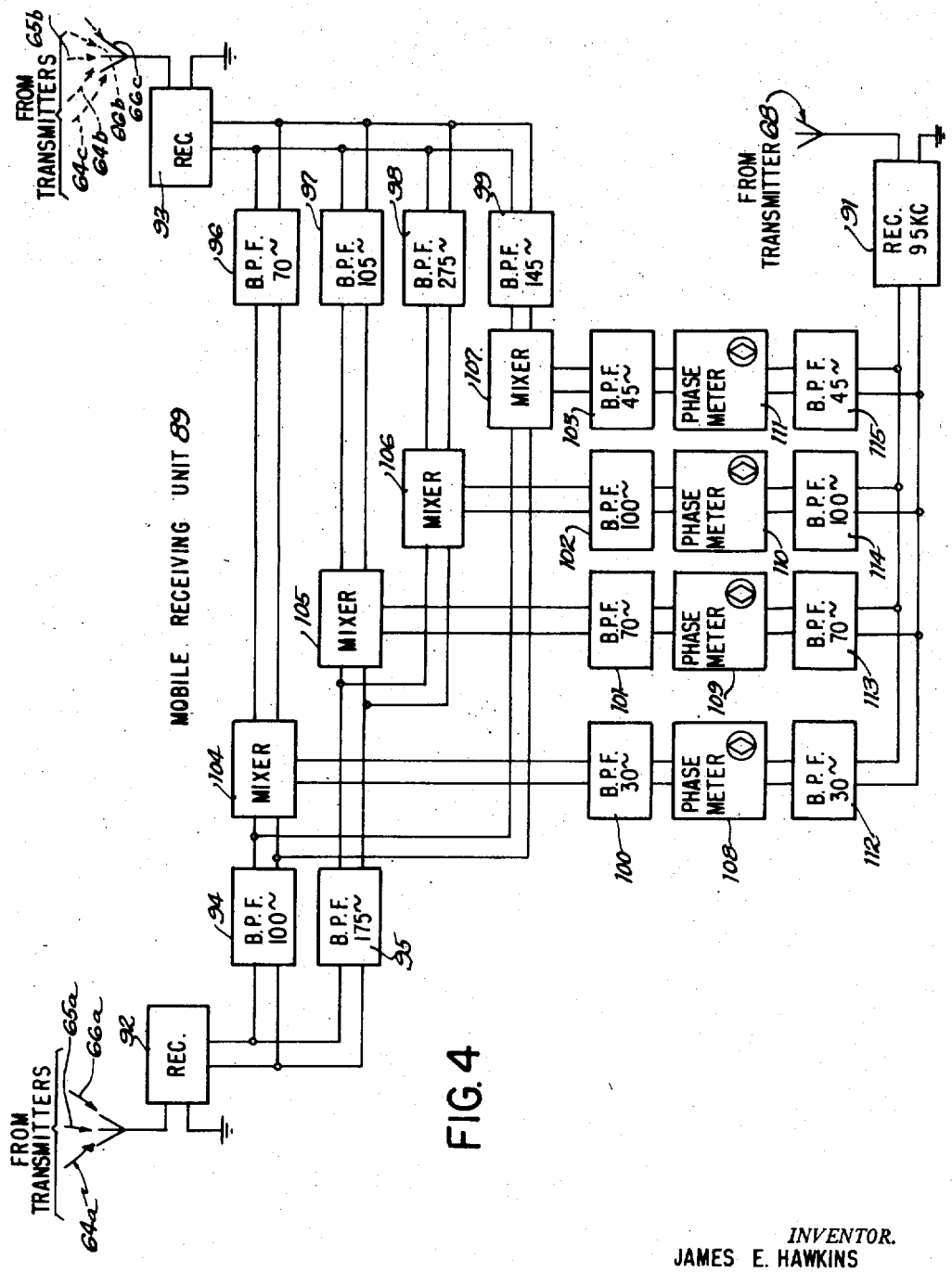
Figure 5:
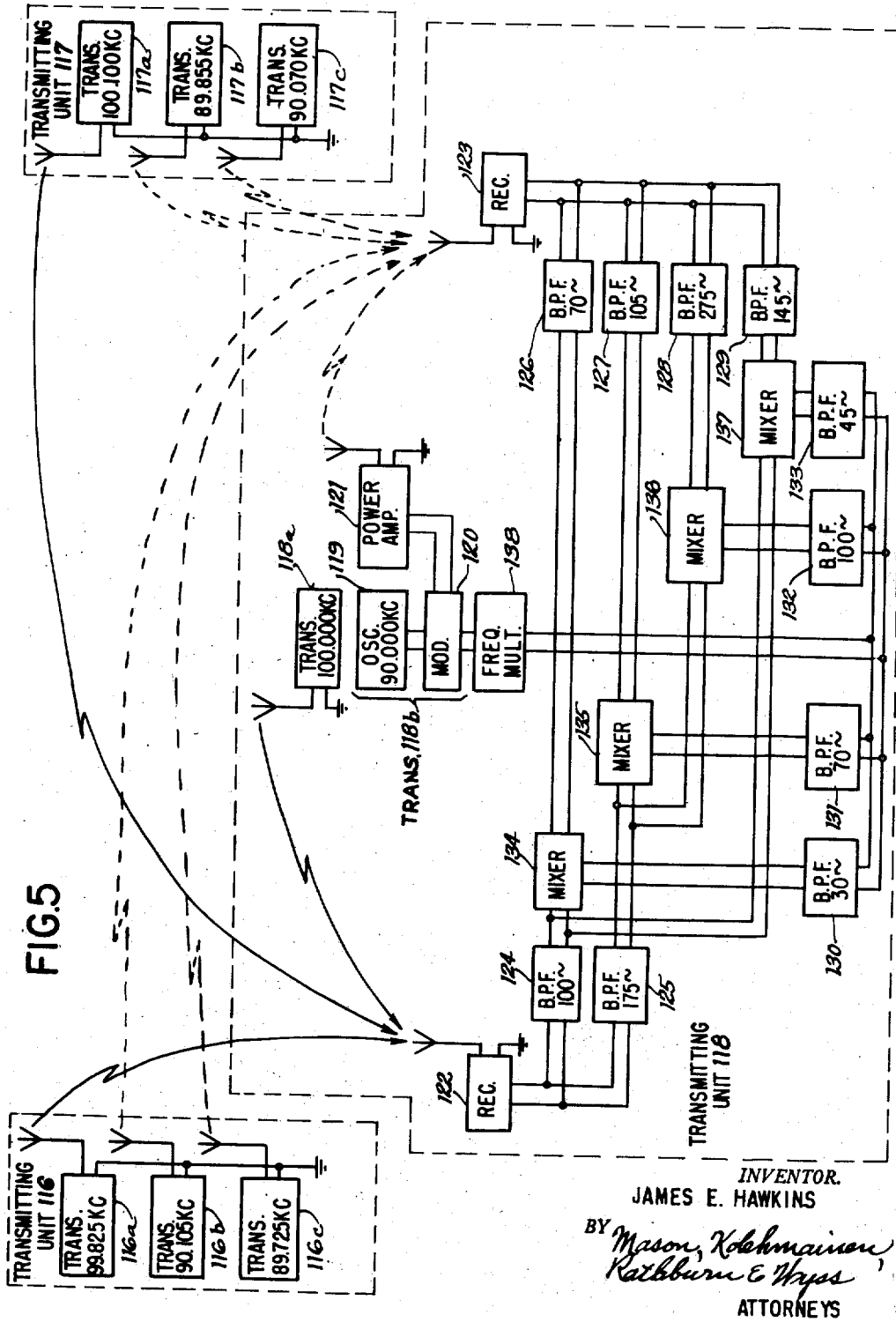
Figure 6:
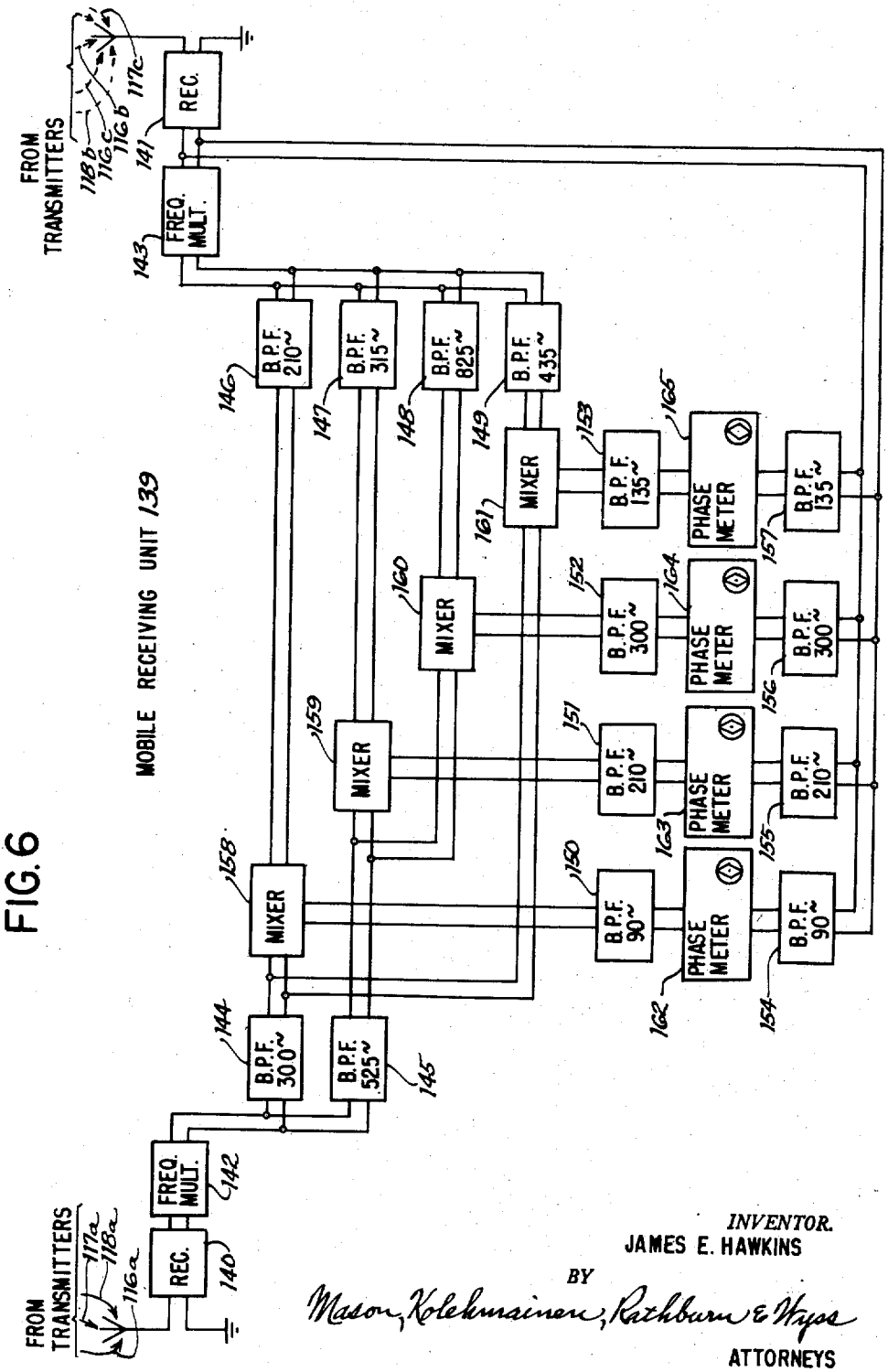
Figure 7:
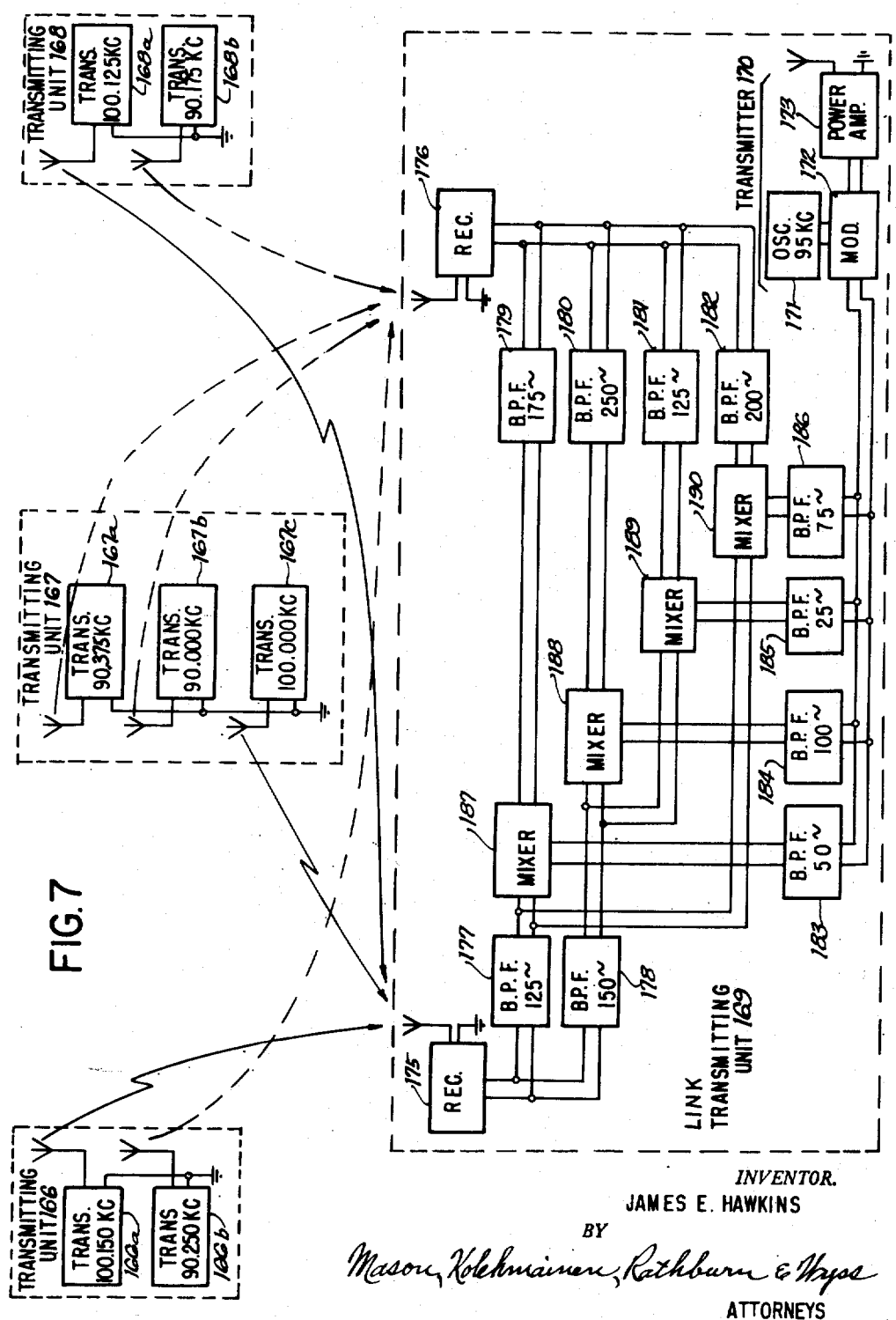
Figure 8:
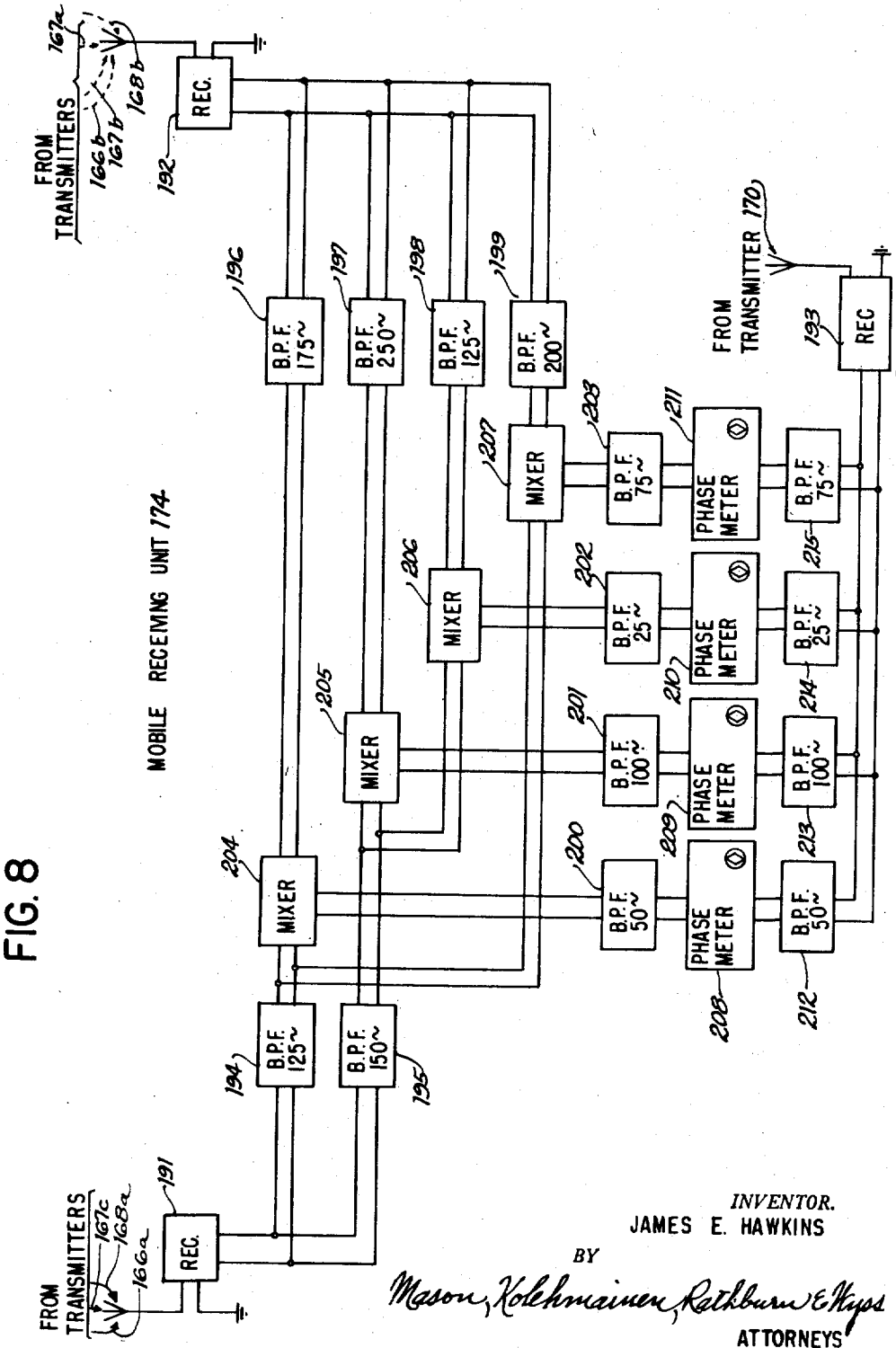

Figs. 3 and 4, when taken together, constitute a diagrammatic representation of a three-foci position indicating system embodying the present invention for providing an unambiguous position fix by means of two sets of indications, each set having high and low phase sensitivity indications, Fig. 3 representing the transmitting end of the system and Fig. 4 representing the mobile receiving equipment;

Figs. 5 and 6, when taken together, constitute a diagrammatic representation of a three-foci position indicating system similar to that shown in Figs. 3 and 4, but in which the necessity for a separate reference signal transmitter and receiver is eliminated, Fig. 5 illustrating the transmitting equipment of the system and Fig. 6 showing the receiving equipment;

Figs. 7 and 8, when taken together, constitute a diagrammatic representation of another three-foci position indicating system embodying the present invention, which is basically similar to that disclosed in Figs. 3 and 4, but in which a different arrangement of transmitters in the transmitting equipment shown in Fig. 7 and a different choice of frequencies is employed, Fig. 8 illustrating the receiving equipment of the system.

In the drawings arrows extending from the various transmitters to the various receivers have been employed to indicate the particular carrier waves radiated by the transmitters. Different types of arrows, i. e., solid line, broken line and dot-and-dash line arrows, have been employed in the various figures of the drawings to indicate different frequencies or groups of frequencies to which the receivers are selective.

Figure 1:
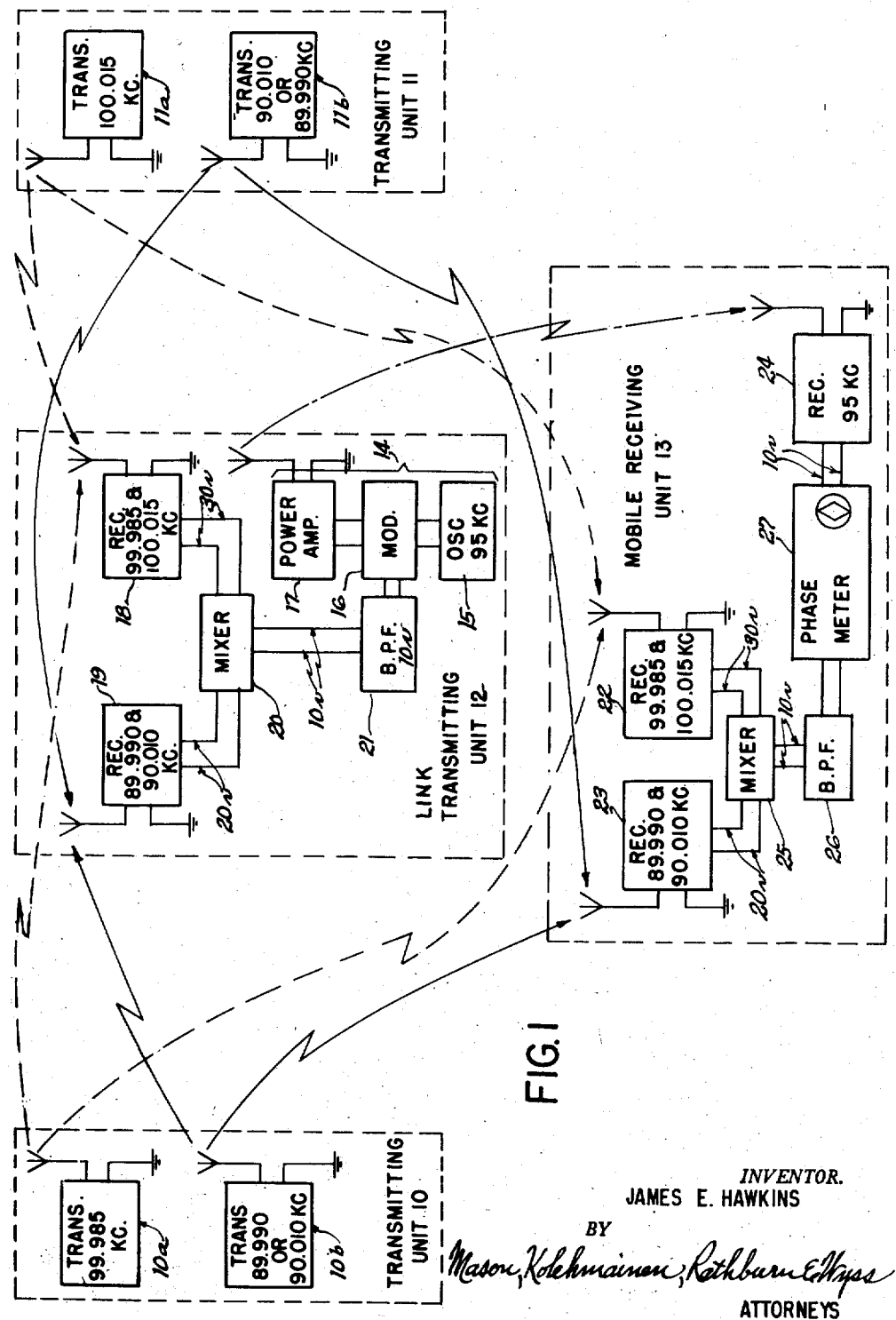
Fig. 1 is a diagrammatic representation of a simple two-foci position indicating system embodying the invention.

Referring now to the drawing and particularly to Fig. 1 thereof, the invention is illustrated as embodied in a two-foci hyperbolic continuous wave system for providing position information at a mobile receiving unit 13, which may be carried by a vessel or vehicle operating within the radius of transmission of a pair of spaced position signal transmitting units 10 and 11 and a fixed link or reference transmitting unit 12. As described more fully hereinafter, the transmitting units 10 and 11 are equipped with a first pair of transmitters 10a and 11a and a second pair of transmitters 10b and 11b for radiating position indicating carrier waves at frequencies which differ not only between pairs but within the repective pairs. As indicated in Fig. 1, the output frequency of the transmitter 10a and the output frequency of the transmitter 11a, forming the first transmitter pair, may be 99.985 kilocycles and 100.015 kilocycles, respectively, such that the difference or beat frequency therebetween is 30 cycles. While the transmitters 10b and 11b have been indicated in Fig. 1 as having alterate output frequencies of 89.990 kilocycles or 90.010 kilocycles, it will be understood that operation of this second pair of transmitters at these alternative frequencies constitutes an alternative condition of operation, and that the transmitters 10b and 11b will never be operated at the same frequencies. In describing the first condition of operation of the system shown in Fig. 1, it will be assumed that the transmitter 10b is operating at an output frequency of 89.990 kilocycles and the transmitter 11b is operating at an output frequency of 90.010 kilocycles, having a difference or beat frequency therebetween of 20 cycles.

The link or reference signal transmitting unit 12, which, as previously indicated, is employed in order to obviate the above mentioned difficulties attendant upon the problem of phase synchronization, is equipped, as is likewise more fully described hereinafter, with a reference signal transmitter 14 for radiating reference signals at a carrier frequency different from the respective frequencies of the transmitters 10a, 11a, 10b and 11b, for reception at the mobile receiving unit 13. Specifically, the reference signal transmitter 14 comprises a carrier wave oscillator 15 adapted for operation at 95 kilocycles, a modulator 16, and a power amplifier 17, whereby the output of the transmitter 14 constitutes a 95 kilocycle carrier wave having modulated thereon a suitable reference signal, which reference signal is developed and supplied to the modulator 16 from a pair of fixed tuned receivers 18 and 19, a mixer or heterodyning means 20, and a band pass filter 21.

The receiver 18 comprises a fixed tuned continuous wave receiver center tuned to a frequency of 100.000 kilocycles and is sharply selective to the 99.985 kilocycle and 100.015 kilocycle carrier waves, respectively radiated by the first pair of transmitters 10a and 11a, the selectivity being such that the carrier waves radiated by the transmitters 10b and 11b are rejected in the radio frequency section of the receiver 18. The beat frequency of 30 cycles between the two carriers accepted by the receiver 18 is reproduced in the audio frequency section of the receiver and delivered as a 30 cycle beat frequency signal to the mixer or heterodyning means 20. Similarly, the receiver 19 comprises a fixed tuned receiver center tuned to a frequency of 90.000 kilocycles and sharply selective to the 89.990 kilocycle and 90.010 kilocycle carrier waves, respectively radiated by the second pair of transmitters 10b and 11b, the selectivity of the receiver 19 being such that the carrier waves radiated by the transmitters 10a and 11a are rejected in the radio frequency section of the receiver 19. The beat frequency of 20 cycles between the two carriers accepted by the receiver 19 is reproduced in the audio frequency section of the receiver and delivered as a 20 cycle beat frequency signal to the other terminals of the mixer or heterodyning means 20. In the mixer 20, the 30 cycle and 20 cycle signals supplied by the receivers 18 and 19, respectively, are heterodyned to produce a 10 cycle reference signal which is supplied through the band pass filter 21 to the modulator 16 of the reference signal transmitter 14, for modulation on the 95 kilocycle carrier wave signal radiated by the transmitter 14.

The mobile receiving unit 13, as shown in Fig. 1, comprises a plurality of fixed tuned receivers 22, 23 and 24, which are respectively center tuned to frequencies of 100.000 kilocycles, 90.000 kilocycles, and 95.000 kilocycles. The receiver 22 is sharply selective to the 99.985 and 100.015 kilocycle carrier waves respectively radiated by the first pair of transmitters 10a and 11a, respectively, and the selectivity is such that the carrier waves radiated by the transmitters 10b, 11b and 14 are rejected in the radio frequency section thereof. Similarly, the receiver 23 is sharply selective to the 89.990 kilocycle and 90.010 kilocycle carrier waves respectively radiated by the second pair of transmitters 10b and 11b, and the selectivity is such that the carrier waves radiated by the transmitters 10a, 11a and 14 are rejected in the radio frequency section thereof. In the receivers 22 and 23, the beat frequencies of 30 cycles and 20 cycles, which respectively exist between the carriers respectively accepted by the receivers, are reproduced in the audio frequency sections thereof and delivered as 30 cycle and 20 cycle beat frequency signals to opposite terminals of a mixer or heterodyning means 25, in which the 30 cycle and 20 cycle signals are heterodyned to produce a position indicating or difference beat frequency signal having a frequency of 10 cycles, which 10 cycle signal is supplied through a band pass filter 26 to a suitable phase meter 27. In the reference signal receiver 24, which is of the amplitude modulation type, the modulated carrier wave is received from the reference signal transmitter 14 and the 10 cycle modulation component is reproduced at the output terminals of the receiver 24 and supplied to the other set of input terminals of the phase meter 27 which functions to measure the phase relationship between the 10 cycle reference and position indicating signals, thereby providing a position indication of the mobile unit 13 relative to the transmitting units 10 and 11.

As previously indicated, the spacing of the iso-phase lines in continuous wave hyperbolic systems of the type disclosed in the above mentioned Honore patent is determined by the average frequency of the pair of radiated waves from which the position indicating or heterodyne signals are derived, and this spacing is equal to one-half the wavelength of a wave having such average frequency. Thus it may be said that the phase sensitivity of the position indicating signal, i. e., the rate at which the phase of the signal changes upon movement of the mobile receiving unit, is determined by the average frequency of the radiated carrier wave signals. Consequently, if the 30 cycle beat frequency signal produced at the mobile receiving unit by the receiver 22 were phase compared with a suitable reference signal in accordance with the teachings of the said Honore patent, the iso-phase lines representative of the same phase relationship between the standing waves produced by the transmitters 10a and 11a along the line joining the units 10 and 11 would be spaced apart a distance equal to one-half the wavelength of a wave having a frequency of 100.000 kilocycles, i. e., approximately 4920 feet. Similarly, if the 20 cycle beat frequency signal produced in the receiver 23 were phase compared with a suitable reference signal, the iso-phase lines representative of the same phase relationship between the standing waves produced by the transmitters 10b and 11b along the line joining the units 10 and 11 would be spaced apart a distance equal to one-half the wavelength of a wave having a frequency of 90.000 kilocycles, i. e., approximately 5467 feet. In each case the phase sensitivity of the position indicating signal, i. e., the rate at which the phase of the signal changes upon movement of the mobile receiving unit, is determined by the mean frequency of the radiated carrier signals.

In accordance with the present invention, however, the 30 cycle and 20 cycle beat frequency signals in the embodiment shown in Fig. 1 are not used for purposes of phase comparison directly, but instead these signals are heterodyned to produce a reference signal, the phase sensitivity of which is determined by the ratio between the mean frequencies of the signals transmitted by the first pair of transmitters 10a and 11a and the second pair of transmitters 10b and 11b. Since the phase of the 20 cycle beat frequency signal changes approximately nine-tenths as fast as the phase of the 30 cycle beat frequency signal upon movement of the mobile unit, and since movement of the mobile unit toward the transmitting unit 11, for example, is towards the transmitters of higher frequency with respect to each pair, thereby providing a phase shift of the same sense, heterodyning the 20 cycle and 30 cycle beat frequency signals together, as previously described, produces an output signal, the phase of which will vary by the difference between the 100.000 kilocycle mean frequency of the transmitters 10a and 11a and the 90.000 kilocycle mean frequency of the transmitters 10b and 11b. In other words, the phase sensitivity of the 10 cycle position indicating signal supplied from the mixer 25 through the band pass filter 26 to the phase meter 27 will correspond to a carrier signal of 10.000 kilocycles, which may be termed a phantom frequency equal to the difference between the real frequencies.

Thus, when the 10 cycle signal is phase compared with the 10 cycle reference signal supplied from the receiver 24, only one-tenth the number of lanes, or 360 degree phase coincidences, between the transmitting units 10 and 11 will be obtained, and these iso-phase lines will be spaced apart along the line joining the units 10 and 11 a distance equal to one-half the wavelength of a wave having a frequency of 10.000 kilocycles or a distance of approximately 49,200 feet. It will thus be observed that, by virtue of the double heterodyning action heretofore described, a position indicating signal is obtained having a low phase sensitivity, while still employing carrier frequencies which, if employed in the system of the Honore patent, would normally produce a phase sensitivity ten times greater.

Considering now the second condition of operation of the system shown in Fig. 1, that is, the operation during which the transmitters 10b and 11b are respectively operating at 90.010 kilocycles and 89.990 kilocycles, which is the reverse of the previously described operation, it will be apparent that the 10 cycle reference signal will be produced at the link transmitting unit 12 and modulated on the 95 kilocycle carrier radiated by the transmitter 14 in exactly the same manner as heretofore described, since reversal of the respective frequencies of the transmitters 10b and 11b has no effect on the link transmitting unit 12. Likewise, at the mobile receiving unit, a 20 cycle beat frequency indicating signal will be produced at the receiver 23, a 30 cycle beat frequency position indicating signal will be produced at the receiver 22, and heterodyning of these two beat frequency signals will produce a 10 cycle position indicating signal for phase comparison with the 10 cycle reference signal reproduced at the reference signal receiver 24. In this case, however, the phase sensitivity of the 10 cycle position indicating signal will be much higher than that obtained in the first condition of operation, for the reason that movement of the mobile receiving unit 13 toward the transmitting unit 11, for example, will be toward the transmitter of lower frequency so far as the transmitters 10b and 11b are concerned. Consequently, the phase shift will be of opposite sense, and upon heterodyning of the 20 cycle and 30 cycle beat frequency signals together, an output signal of 10 cycles is obtained, the phase of which varies in accordance with the sum of the 100.000 kilocycle mean frequency of the transmitters 10a and 11a and the 90.000 kilocycle mean frequency of the transmitters 10b and 11b. In other words, the phase sensitivity of the 10 cycle position indicating signal supplied to the phase meter 27 under this condition of operation corresponds to the phase sensitivity of a carrier signal of 190.000 kilocycles, which may be termed a phantom frequency, equal to the sum of the real frequencies.

Thus, when the 10 cycle position indicating signal is phase compared with the 10 cycle reference signal, there will be approximately 1.9 times the number of lanes, or 360 degree phase coincidences between the transmitting units 10 and 11 as would have been obtained if the 30 cycle beat frequency signal, for example, had been phase compared, and consequently these iso-phase lines will be spaced apart along the line joining the units 10 and 11 a distance equal to one-half the wave length of a wave having a frequency of 190.000 kilocycles or a distance of approximately 2,590 feet. In other words, there will be 19 times the number of lanes, or 360 degree phase coincidences between the transmitting units 10 and 11 as are obtained from the phantom frequency equal to the difference between the real frequencies. Thus, under this condition of operation a position indicating signal is obtained having a high phase sensitivity, while employing carrier frequencies which, if employed in the system of the Honore patent, would normally produce a phase sensitivity only 10/19 as great. The manner in which the basic principles embodied in the system of Fig. 1, i. e., the provision of high or low phase sensitivity position indications, while eliminating the problems of phase synchronization and at the same time using carrier frequencies suitable for efficient long range propagation, may be employed in various combinations will become apparent from the following description of the various position indicating systems shown in Figs. 2 to 8 inclusive.

From the foregoing explanation, it will be understood that the system as shown in Fig. 1 actually comprises one half of a complete radio location system. Thus, regardless of whether the sum or difference frequency principle described above is employed, a single set of lanes defined by hyperbolic iso-phase lines having the radiation points of the transmitting units 10 and 11 as foci are produced by the transmitting facilities embodied in these two units. The transmission facilities are, however, susceptible of rearrangement to convert the illustrated system into a ranging or distance determining system. To this end, the transmitting equipment embodied in the transmitting unit 11 is located on the mobile receiving unit 13 and the equipment provided in the link transmitting unit 12 is located at the same position as the transmitting equipment embodied in the unit 10. As thus rearranged, the signal transmission facilities of the system function to produce phase coincidence or iso-phase lines in space which are of circular contour and have the radiation point of the transmitting unit 10 as a common center. Thus, the phase meter 27 provided at the mobile receiving unit 13 is controlled to indicate the position of the receiving point relative to a particular pair of iso-phase lines so that the distance separating the receiving unit 13 from the radiation point of the transmitting unit 10 is indicated by this meter. Aside from the change in contour of the phase coincidence or iso-phase lines produced by the described relocation of the system components, the mode of operation of the system is exactly the same as explained above. From this explanation it will be understood that if the difference frequency principle is utilized, the circular iso-phase lines produced in space will have a very wide spacing, whereas if the sum frequency principle is employed, the circular iso-phase lines will be spaced apart by relatively short distances.

Figure 2:
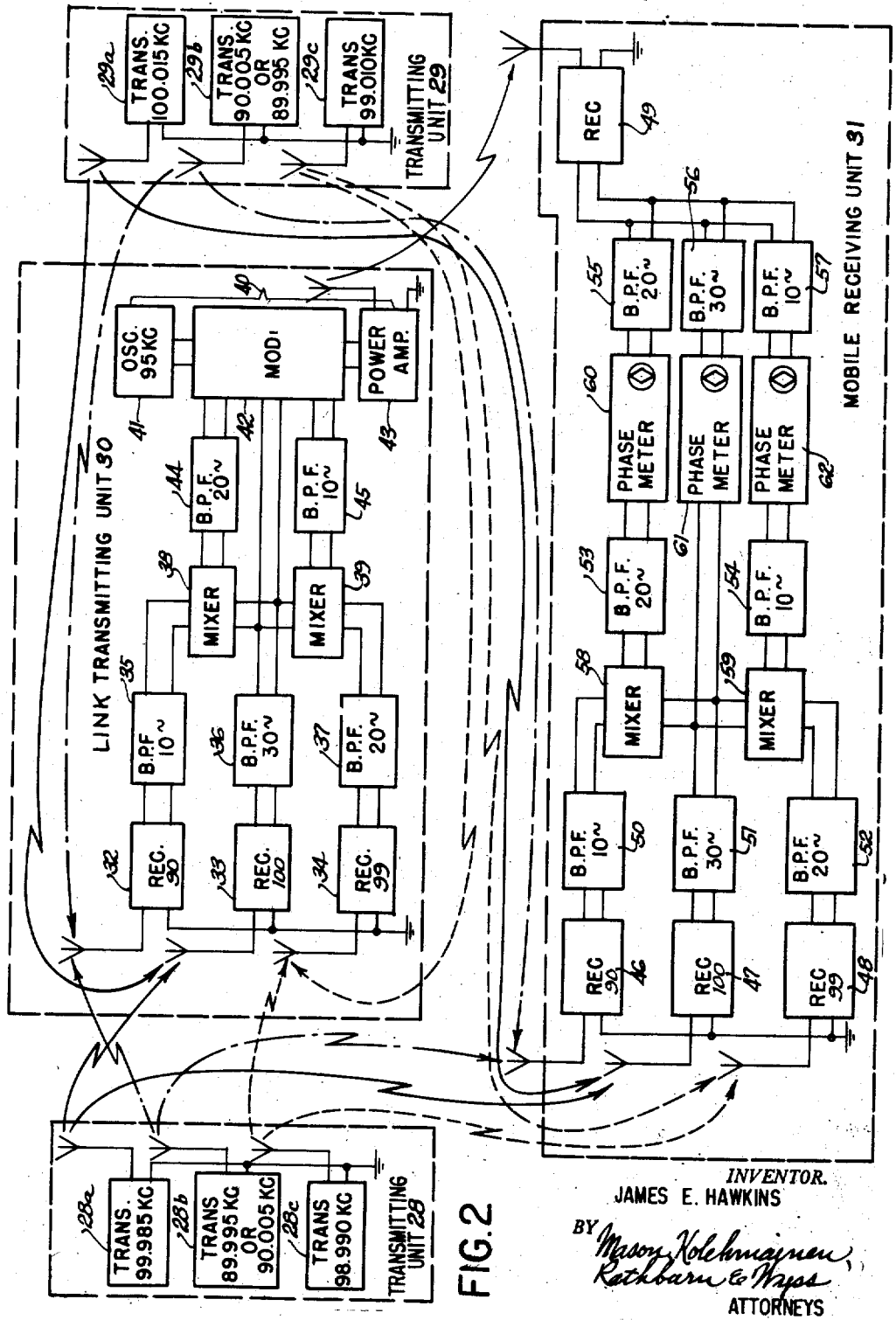
Fig. 2 is a diagrammatic representation of a two-foci position indicating system embodying the present invention for simultaneously providing position indications of high, medium and low phase sensitivity, respectively.

Referring now to Fig. 2, a position indicating system is shown which constitutes a two-foci system for simultaneously providing position indications of high, medium and low phase sensitivity. In the system of Fig. 2, a pair of spaced position signal transmitting units 28 and 29 and a link or reference signal transmitting unit 30 are provided for radiating signals to a mobile receiving unit 31. The transmitting units 28 and 29 include three pairs of transmitters, 28a and 29a, 28b and 29b, and 28c and 29c, for radiating position indicating carrier waves at frequencies which differ not only between pairs but within the respective pairs, as in the previously described embodiments of the invention. The respective frequencies at which these various transmitters operate are indicated on the drawing, and, as in the case of Fig. 1, it will be understood that the alternative carrier frequencies indicated for the transmitters 28b and 29b are intended to represent different conditions of operation, and these two transmitters are not intended during any condition of operation to operate at the same frequency.

The link transmitter 30, as shown, comprises a plurality of receivers 32, 33 and 34, the output circuits of which are respectively connected to suitable band pass filters 35, 36 and 37, which in turn have their output circuits connected, as shown, to a pair of mixers or heterodyning means 38 and 39. In addition the transmitting unit 30 includes a reference signal transmitter 40 comprising a 95 kilocycle carrier wave generator or oscillator 41, a modulator 42, and a power amplifier 43, the modulator 42 being supplied, as will be more fully described hereinafter, from the output side of the band pass filter 36 and from a pair of additional band pass filters 44 and 45.

The receivers 32, 33 and 34 are fixed-tuned receivers similar to the receivers 18 and 19 of Fig. 1 and are respectively center tuned to frequencies of 90.000 kilocycles, 100.000 kilocycles, and 99.000 kilocycles. The receiver 32 is thus sharply selective to the 89.995 kilocycle and 90.005 kilocycle carrier waves radiated by the transmitters 28b and 29b, and the beat frequency of 10 cycles between these two carrier waves is reproduced in the receiver 32 and supplied to the band pass filter 35 as a beat frequency signal having a frequency of 10 cycles. The receiver 33 is sharply selective to the 99.985 kilocycle and 100.015 kilocycle carrier waves radiated by the transmitters 28a and 29a, and the beat frequency of 30 cycles between these two carrier waves is reproduced in the receiver 33 and delivered as a 30 cycle beat frequency signal to the band pass filter 36. Similarly the receiver 34 is sharply selective to the 98.990 kilocycle and 99.010 kilocycle carrier waves radiated by the transmitters 28c and 29c, and the 20 cycle beat frequency between these carrier waves is reproduced in the receiver 34 and delivered to the band pass filter 37.

As indicated in Fig. 2, the output terminals of the band pass filters 35 and 36 are connected to the input terminals of the mixer 38 so as to supply 10 cycle and 30 cycle beat frequency signals thereto, which signals are heterodyned in the mixer 38 to produce a reference signal having a frequency equal to the difference between the 10 cycle and 30 cycle signals, that is a frequency of 20 cycles, and this 20 cycle reference signal is passed through the band pass filter 44 to the modulator 42 of the reference signal transmitter 40. Similarly the 30 cycle and 20 cycle beat frequency signals are delivered from the band pass filters 36 and 37 to the mixer 39, wherein they are heterodyned to provide a second reference signal having a beat frequency of 10 cycles, which is passed through the band pass filter 45 to the modulator 42. Likewise the 30 cycle beat frequency signal is delivered from the band pass filter 36 directly to the modulator 42 and it will thus be seen that three reference signals having frequencies respectively equal to 10 cycles, 20 cycles and 30 cycles are supplied to the modulator 42 of the reference signal transmitter 40 for modulation on the 95 kilocycle carrier wave signal radiated by the transmitter 40 to the mobile receiving unit 31.

The mobile receiving unit 31, as shown in Fig. 2, comprises a plurality of fixed-tuned receivers 46, 47, 48 and 49, which are respectively center tuned to frequencies of 90.000 kilocycles, 100.000 kilocycles, 99.000 kilocycles and 95.000 kilocycles. In addition, the mobile receiving unit includes a plurality of band pass filters 50, 51, 52, 53, 54, 55, 56 and 57, a pair of mixers or heterodyne means 58 and 59 and a plurality of phase meters 60, 61 and 62.

As will be apparent from an inspection of Fig. 2, the receivers 46, 47 and 48, the band pass filters 50 to 54, inclusive, and the mixers or heterodyne means 58 and 59 are identically arranged, and operate in the same manner as the receivers, band pass filters, and mixers at the link transmitting unit 30 to provide a plurality of beat frequency position indicating signals having frequencies of 20 cycles, 30 cycles and 10 cycles, which are supplied to the left hand terminals of the phase meters 60, 61 and 62, respectively. The receiver 49 at the mobile receiving unit 31 is of the amplitude modulation type and is sharply selective to the modulated carrier wave radiated by the reference signal transmitter 40 at the link transmitting unit 30. The three reference signals which are modulated on the reference signal carrier wave are reproduced in the receiver 49 and supplied through the band pass filters 55, 56 and 57 to the right hand terminals of the phase meters 60, 61 and 62 for phase comparison with the position indicating signals of equal frequency applied to the left hand terminals of the phase meters 60, 61 and 62.

As was the case in connection with Fig. 1, the position indicating system of Fig. 2 is capable of alternative operations depending upon whether the transmitters 28b and 29b are operating at their respective higher or lower frequencies. Assuming, first, that the transmitter 28b is operating at a frequency of 89.995 kilocycles and the transmitter 29b is operating at a frequency of 90.005 kilocycles, the operation of the system shown in Fig. 2 is such as to produce, at the phase meters 60, 61 and 62, three separate position indicating signals, all of which are indicative of the position of the mobile receiving unit relative to the transmitting units 28 and 29, but which are all of different phase sensitivities. Thus, for the reasons explained in connection with the system of Fig. 1, the 20 cycle beat frequency position indicating signal which is derived from the 10 cycle and 30 cycle beat frequency signals produced by the receivers 46 and 47 will have a phase sensitivity determined by the difference between the mean frequencies of the pairs of carrier waves to which the receivers 46 and 47 respond. Accordingly the 20 cycle position indicating signal supplied to the phase meter 60 has a phase sensitivity corresponding to a carrier signal of 10 kilocycles, and the distance between iso-phase lines represented by each 360 degree rotation of the phase meter 60, along the line joining the transmitting units 28 and 29, will be approximately 49,200 feet. This constitutes what may be termed in the system of Fig. 2 a position indication of medium phase sensitivity.

On the other hand, the 30 cycle position indicating signal supplied directly to the phase meter 61 from the band pass filter 51 without any second heterodyning operation has a phase sensitivity determined by the mean frequency of the carrier waves received at the receiver 47, i. e., 100.000 kilocycles, and consequently the iso-phase lines represented by each 360 degree rotation of the phase meter 61 will be spaced apart, along the line joining the transmitting units 28 and 29, a distance of approximately 4,920 feet, which constitutes, in the system of Fig. 2, a high phase sensitivity position indication.

The 10 cycle position indicating signal supplied to the phase meter 62 from the band pass filter 54 is derived from the 20 cycle and 30 cycle beat frequency signals produced by the receivers 48 and 47, respectively, and consequently will have a phase sensitivity determined by the difference between the pairs of carrier waves received by these receivers, i. e., between a mean frequency of 100.000 kilocycles and a mean frequency of 99.000 kilocycles. Thus the 10 cycle position indicating signal supplied to the phase meter 62 has a phase sensitivity corresponding to a difference or phantom frequency of 1.000 kilocycle, and the iso-phase lines corresponding to each 360 degrees of rotation of the phase meter 62 will be spaced apart, along the line joining the transmitting units 28 and 29, a distance of approximately 492,000 feet which constitutes, in the system of Fig. 2, a low phase sensitivity indication. It will thus be seen that three position indications are obtained, all of which represent the position of the mobile receiving unit 31 relative to the transmitting units 28 and 29 and having widely different phase sensitivities.

Assuming, for ease of discussion, that the distance of 4,920 feet between iso-phase lines in the hyperbolic pattern corresponding to the phase meter 61 constitutes approximately one mile, it will be seen that three hyperbolic patterns are provided in which the iso-phase lines are respectively spaced apart distances of one mile, ten miles and one hundred miles. Since the position of the mobile receiving unit 31 will usually be known within a distance of 100 miles, the three sets of indications may be employed accurately to determine the position of the mobile receiving unit 31 within such 100 mile range. If transmitting units 28 and 29 are 100 miles or less apart, that is, one 360 degree phase coincidence or less, no ambiguity can result in the low phase sensitivity indication, since 360 degrees or less will cover the entire area on one side of a line. The low phase sensitivity reading obtained from the phase meter 62 will give the relative position of the mobile receiving unit with respect to a known pair of iso-phase lines spaced 100 miles apart and will thus definitely establish within which of the ten pairs of iso-phase lines spaced ten miles apart and indicated by the phase meter 60 the mobile receiving unit is positioned. Similarly, indications of the phase meter 60 will establish the position of the mobile receiving unit with respect to that pair of ten mile iso-phase lines so as to determine within which pair of one mile iso-phase lines corresponding to the reading of the phase meter 61 the mobile unit is positioned. Thereupon the indications of the phase meter 61 will accurately determine the position of the mobile receiving unit with respect to the transmitting units 28 and 29 without ambiguity in so far as the particular iso-phase line is concerned.

Under the second condition of operation of the system of Fig. 2, i. e., with the transmitters 28b and 29b operating respectively at frequencies of 90.005 kilocycles and 89.995 kilocycles, the phase meters 61 and 62 are effective exactly as in the first assumed condition of operation to provide position indications of phase sensitivities such that the iso-phase lines are spaced apart 4,920 feet (approximately 1 mile) and 492,000 feet (approximately 100 miles) respectively. In this condition of operation, however, the relative values of the carrier waves radiated from the transmitters 28b and 29b are reversed and consequently the 20 cycle position indicating signal for the phase meter 60 derived from these carrier waves will have a phase sensitivity corresponding to a frequency equal to the sum of the mean frequencies, 100.000 kilocycles and 90.000 kilocycles, and the iso-phase lines represented by 360 degree rotation of the phase meter 60 will be spaced apart, along the line joining the transmitting units 28 and 29, a distance of 2,590 feet. With the above approximations, three hyperbolic patterns are thus obtained in which the iso-phase lines are respectively spaced apart one-half mile, one mile, and 100 miles, the phase meter 60 thus providing the final high phase sensitivity position indication of extreme accuracy.

As previously indicated, the point of location of the receiving unit along the particular iso-phase line, as determined under either of the above described conditions of operation, will not be indicated by the system of Fig. 2 since only two position indicating transmitting units are employed, and it is therefore necessary, in order to obtain absolute determination of the position of the receiving point, to employ at least three spaced position signal transmitting units, different pairs of which function to provide a grid-like pattern of intersecting hyperbolic lines, as will be more fully explained in connection with Figs. 3 to 8, inclusive.

In the three-foci position indicating system shown in Figs. 3 and 4 for providing an unambiguous position indication by means of two sets of high and low phase sensitivity indications, the transmitting system, as shown in Fig. 3, comprises three spaced position signal transmitting units 64, 65 and 66 and a link or reference signal transmitting unit 67. As shown in Fig. 3, the transmitting unit 64 is provided with a plurality of transmitters 64a, 64b and 64c for radiating position indicating carrier waves at frequencies of 99.825 kilocycles, 90.105 kilocycles, and 89.725 kilocycles, respectively. The transmitting unit 65 is provided with similar transmitters 65a and 65b for radiating position indicating carrier waves at frequencies of 100.000 kilocycles and 90.000 kilocycles, respectively, and the transmitting unit 66 is provided with transmitters 66a, 66b and 66c for radiating position indicating carrier waves at frequencies of 100.100 kilocycles, 89.855 kilocycles and 90.070 kilocycles, respectively.

The link transmitting unit 67 is provided with a reference signal transmitter 68 comprising a 95 kilocycle carrier wave generator or oscillator 69, a modulator 70, and a power amplifier 71 for radiating reference signals as modulation components on a carrier wave having a frequency of 95 kilocycles. In addition the link transmitting unit 67 comprises a pair of fixed-tuned receivers 72 and 73, a plurality of band pass filters 74 to 83, inclusive, and a plurality of mixer or heterodyning means 84, 85, 86 and 87. The receiver 72 is center tuned to a frequency of 100.000 kilocycles and is sharply selective to the carrier waves of 99.825 kilocycles, 100.000 kilocycles and 100.100 kilocycles, respectively radiated by the transmitters 64a, 65a and 66a. The construction of the receiver 72 is such that the difference or beat frequencies between the pairs of carrier waves are reproduced in the audio frequency section of the receiver and appear in the output circuits thereof as beat frequency signals having frequencies respectively equal to 175 cycles (the beat frequency between the carrier waves from the transmitters 64a and 65a); 100 cycles (the difference between the frequencies of the carrier waves from the transmitters 65a and 66a); and 275 cycles (the beat frequency difference between the carrier waves from the transmitters 64a and 66a). Only the first two of the beat frequency signals appearing in the output circuits of the receiver 72 are utilized, these signals being separated out by the band pass filters 74 and 75, and if desired a suitable wave trap may be employed for eliminating the 275 cycle beat frequency signal. As shown in Fig. 3, the 100 cycle beat frequency signal from the band pass filter 74 is supplied in parallel to the mixers or heterodyning means 84 and 87, while the 175 cycle beat frequency signal from the band pass filter 75 is supplied in parallel to the mixers 85 and 86.

The receiver 73 is center tuned to a frequency of 90,000 kilocycles and is sharply selective to all of the carrier waves radiated from the transmitters 64b, 65b, 66b, 64c and 66c. The construction of the receiver 73 is such that the beat frequencies between various pairs of the carrier waves received thereby are reproduced in the audio section thereof and supplied to the various band pass filters 76, 77, 78 and 79. These band pass filters are constructed to pass only frequencies which correspond to the beat frequencies between the 90,000 kilocycle carrier wave radiated by the transmitter 65b and the respective carrier waves radiated by the other transmitters 64b, 64c, 66b and 66c. Thus the band pass filter 76 passes the 70-cycle beat frequency signal representative of the beat frequency between the carriers of the transmitters 65b and 66c; the band pass filter 77 passes the 105-cycle beat frequency signal representative of the beat frequency between the carriers radiated by the transmitters 65b and 64b; the band pass filter 78 passes the 275-cycle beat frequency signal representative of the beat frequency between the carriers radiated by the transmitters 65b and 64c; and the band pass filter 79 passes the 145-cycle beat frequency signal representative of the beat frequency between the carriers radiated by the transmitter 65b and the transmitter 66b. Suitable wave traps may be provided, if desired, for eliminating other beat frequency signals produced in the receiver 73, such, for example, as the 215-cycle beat frequency signal representative of the beat frequency between the carrier waves radiated by the transmitters 66b and 66c, but by proper selection of the frequencies and by resort to sharply selective band pass filters, the necessity for such wave traps is usually avoided.

The 70 cycle beat frequency signal is delivered from the band pass filter 76 to the mixer 84, wherein it is heterodyned with the 100 cycle beat frequency signal from the band pass filter 74 to produce a 30 cycle reference signal representative of the beat frequency between the signals supplied to the mixer 84, and this 30 cycle reference signal is delivered through the band pass filter 80 to the modulator 70 of the reference signal transmitter 68. Similarly, the 105 cycle beat frequency signal from the band pass filter 77 is delivered to the mixer 85, where it is heterodyned with the 175 cycle beat frequency signal from the band pass filter 75 to produce a 70-cycle reference signal which is delivered through the band pass filter 81 to the modulator 70. In a similar manner the 275 cycle beat frequency signal and the 145 cycle beat frequency signal are delivered from the band pass filters 78 and 79, respectively, to the mixers 86 and 87, where they are respectively heterodyned with the 175 cycle and 100 cycle beat frequency signals from the band pass filters 75 and 74 to produce 100 cycle and 45 cycle reference signals which are supplied through the band pass filters 82 and 83, respectively, to the modulator 70. Thus it will be seen that four reference signals having frequencies of 30 cycles, 70 cycles, 100 cycles and 45 cycles are modulated on the 95 kilocycle carrier wave for radiation from the transmitter 68 to the mobile receiving unit 89 of Fig. 4.

The equipment at the mobile receiving unit 89, as shown in Fig. 4, comprises a plurality of receivers 91, 92 and 93, which are respectively fixed tuned to carrier frequencies of 95 kilocycles, 100 kilocycles and 90 kilocycles. Thus the receiver 91 is sharply selective to the modulated 95 kilocycle carrier wave radiated by the reference signal transmitter 68, the receiver 92 is sharply selective to the position indicating carrier wave signals radiated from the transmitters 64a, 65a and 66a, and the receiver 93 is sharply selective to the position indicating carrier wave signals radiated from the transmitters 64b, 65b, 66b, 64c and 66c. Associated with the receivers 92 and 93 are suitable band pass filters 94 to 103, inclusive, which correspond in function and arrangement to the band pass filters 74 to 83, inclusive, of the link transmitting unit 67, and with a plurality of mixers or heterodyning means 104, 105, 106 and 107, which correspond in function and arrangement to the mixers 84 to 87, inclusive, of the link transmitting unit. It will be apparent from the foregoing description of the equipment at the link transmitting unit 67, that the receivers 92 and 93, the band pass filters 94 to 103, inclusive, and the mixer or heterodyning means 104 to 107, inclusive, function to provide a plurality of beat frequency position indicating signals having frequencies of 30 cycles, 70 cycles, 100 cycles and 45 cycles, respectively, which are delivered from the band pass filters 100, 101, 102 and 103 to a plurality of phase meters 108, 109, 110 and 111. At the reference signal receiver 91 the four reference signals modulated on the carrier wave received from the transmitter 68 are reproduced and appear at the output terminals of the receiver 91 as reference signals of 30 cycles, 70 cycles, 100 cycles and 45 cycles respectively, which reference signals are supplied through suitable band pass filters 112, 113, 114 and 115 to the respective opposite terminals of the phase meters 108 to 111, inclusive, whereby the phase meters function to measure the phase relationship between the respective pairs of position indicating and reference signals of equal frequency supplied thereto.

As is more fully explained hereinafter, the phase meters 108 and 111 respectively function to produce low and high phase sensitivity indications of the position of the mobile receiving unit relative to the spaced transmitting units 65 and 66, and the phase meters 110 and 109 respectively function to produce low and high phase sensitivity indications of the position of the mobile receiving unit 89 relative to the spaced transmitting units 65 and 64. More particularly, the 30 cycle position indicating signal with which the phase meter 108 is energized is derived from the 100 cycle and 70 cycle beat frequency signals respectively by the receivers 92 and 93, and, as heretofore explained, the 100 cycle beat frequency signal constitutes the beat frequency between the carrier waves radiated by the transmitters 65a and 66a, while the 70 cycle beat frequency signal represents the beat frequency between the carrier waves radiated by the transmitters 65b and 66c. Consequently the phase sensitivity of the 30 cycle position indicating signal corresponds to the first condition of operation described in connection with Fig. 1 and is determined by the difference between the mean frequencies of the pairs of carrier waves radiated by the two pairs of transmitters 65a, 66a and 65b, 66c, the transmitter of higher frequency in each pair being located at the same transmitting unit, i. e., unit 66. Accordingly, since the difference between the mean frequencies of the pairs of carrier waves is approximately 10 kilocycles, each complete rotation of the phase meter 108 will indicate approximately ten miles of movement of the mobile receiving unit 89 along a line joining the transmitting units 65 and 66.

On the other hand, the 45 cycle position indicating signal with which the phase meter 111 is energized is derived from the 100 cycle and the 145 cycle beat frequency signals respectively produced at the receivers 92 and 93, but in this case the 145 cycle beat frequency signal represents the beat frequency between the carrier wave signals transmitted by the transmitters 65b and 66b. The phase sensitivity of the 145 cycle position indicating signal accordingly corresponds to the second operating condition described in connection with Fig. 1 and is determined by the sum of the mean frequencies of the pairs of carrier waves radiated by the two pairs of transmitters 65a, 66a and 65b, 66b, i. e., approximately 190 kilocycles, the transmitter of higher frequency in each pair being located at different transmitting units. Consequently one complete revolution of the phase meter 111 will indicate approximately one-half mile of movement of the mobile receiving unit 89 along a line joining the transmitting units 65 and 66.

A similar analysis of the derivation of the 70 cycle and 100 cycle position indicating signals by which the phase meters 109 and 110 are energized will show that the phase meter 109 has a phase sensitivity determined by the sum of the mean frequncies between the pairs of trasmitting units 64a, 65a and 64b, 65b, thus providing a high phase sensitivity indication wherein each complete revolution of the phase meter 109 indicates a movement of approximately one-half mile along a line joining the transmitters 64 and 65. Similarly, the phase meter 110 has a phase sensitivity determined by the difference in the mean frequencies of the carrier waves radiated by the pairs of transmitters 65a, 64a and 65b, 64c, whereby one complete revolution of the phase meter 110 indicates approximately ten miles of movement of the mobile receiving unit 89 along the same base line.

It will thus be seen that two pairs of intersecting sets of iso-phase lines of hyperbolic pattern are provided by the indications of the phase meters 108-111, inclusive, one pair comprising a hyperbolic grid in which the iso-phase lines are spaced approximately ten miles apart along the base lines between the respective pairs of transmitters, and the other pair comprising similar patterns in which the iso-phase lines are spaced approximately one-half mile apart. Accordingly all ambiguity within a known ten mile area is eliminated and, if desired, a third pair of intersecting patterns having the iso-phase lines spaced apart approximately 100 miles may be provided as in the system of Fig. 2.

One of the problems involved in the operation of a system such as that illustrated in Figs. 3 and 4 and described above, is that of minimizing distortion of the hyperbolic grids or more particularly the individual hyperbolic lines thereof as a result of movement of the mobile receiving unit 89 toward and away from the link transmitting unit 67. In this regard, it will be understood that the four reference signals are constantly radiated as modulation components on the carrier wave transmitted by the link transmitter 68. Thus, each reference signal effectively has a standing wave pattern in space which is determined by the wavelength of the particular reference signal. This means that as the mobile receiving unit 89 moves toward and away from the link transmitting unit 67 there is an apparent change in the phase of the reference signal as reproduced by the receiver 93 at the mobile receiving unit 89. The apparent phase change in this reference signal is of course a maximum when the mobile receiving unit 89 is moving directly toward the link transmitting unit 67 and is zero when the mobile receiving unit is moving on an arc having the radiation point of the link transmitting unit 67 as a center. In any event, the effect of the phase change of the reference signals produced in this manner is very small due to the relatively long wavelength of the low frequency reference signals.

For example, if the reference signal frequency is 300 C. P. S., one wavelength is approximately 600 miles, and thus, a 360° phase shift is produced in 600 miles, if the mobile receiving unit is moved in such a direction as to maintain constant phase as regards the positions signal frequencies but to be changing at the maximum rate as regards the reference signal frequency. If the average position signal frequency is approximately 100 kilocycles, then 360° phase shift at the wavelength of the average position signal frequency on the base line joining the position signal radiation points represents approximately 5,000 feet or 1 mile. The error introduced by neglecting the effect of the modulation frequency is, therefore, equivalent to one lane every 300 miles. The reference signal frequency thus has the effect of distorting the hyperbolas, the distortion being a function of the distance of the mobile receiving unit from the link transmitter, the position of the link transmitter with respect to the position signal transmitters, and the ratio of the reference signal frequency to the average position signal frequency. This distortion may be calculated and the modified hyperbolas plotted on the hyperbolic charts.

As will be seen from the above discussion, the amount of distortion or error is relatively small when dealing with modulation frequencies under 1000 C. P. S. and working directly with position signal frequencies of the order of 100 kilocycles or greater. However, in systems in which the above described difference frequency principle is utilized, the problem is more severe. In such systems it may not be possible to neglect the equiphase distortion effect due to the reference signal frequency since it is not negligible with respect to the difference frequency. Since the difference frequency is the frequency which determines the distance between 360° phase shift or lanes, it will be seen that if this difference frequency is small, say 10 kilocycles, and a reference signal frequency of 1000 C. P. S. is used, a major distortion effect results. As mentioned above, however, the distortion can be calculated and the hyperbolas adjusted.

It will thus be understood that in a system such as that disclosed in Figs. 3 and 4, wherein the sum and difference principles are utilized, the distortion effects are different with respect to the widely spaced and closely spaced hyperbolas. Specifically, the degree of distortion of the widely spaced iso-phase line with respect to which position indications are provided by the phase meters 108 and 110 is different from the degree of distortion of the closely spaced hyperbolic iso-phase lines with respect to which position indications are provided by the second pair of phase meters 111 and 109. Hence, the relative errors as measured by the two sets of phase meters are not the same and under certain circumstances confusion may result.

In order to obviate the possibility of such confusion, it is desirable that the degree of apparent distortion produced in the manner explained above be the same both with respect to the widely spaced iso-phase lines for which position indications are provided by the phase meters 108 and 110 and the closely spaced iso-phase lines for which position indications are provided by the phase meters 111 and 109. It has been found that if this end is achieved, the possibility of confusion between the indications provided by the two sets of phase meters is completely obviated. In order to accomplish this end, it is necessary so to select the frequency at which signals are radiated by the various transmitters shown in Fig. 3 that the ratio of the reference signal frequency for the difference hyperbolas to reference signal frequency for the sum hyperbolas be the same or approximately the same as the ratio of the average difference position signal frequency for the difference hyperbolas to the average sum position signal frequency for the sum hyperbolas. This may be accomplished by employing transmitters at the various transmitting unit 64, 65 and 66 shown in Fig. 3 to radiate signals at the frequencies given below and also by changing the characteristics of the receiving and translating equipment of the units 67 and 89 in the manner indicated below:

```
Transmitter 64a_____ Radiates 90.330 kc.
Transmitter 64b_____ Radiates 99.955 kc.
Transmitter 64c_____ Radiates 89.970 kc.
Transmitter 65a_____ Radiates 100.000 kc.
Transmitter 65b_____ Radiates 90.000 kc.
Transmitter 66a_____ Radiates 89.760 kc.
Transmitter 66b_____ Radiates 100.050 kc.
Transmitter 66c_____ Radiates 90.040 kc.
Receivers 72 and 92_____ Accept 99.955, 100.000
                                and 100.050 kc.
Receivers 73 and 93_____ Accept 89.760, 89.970,
                                90.000, 90.040 and
                                90.330 kc.
Band pass filters 74 and 94_____ Pass 50 C. P. S.
Band pass filters 75 and 95_____ Pass 45 C. P. S.
Band pass filters 76 and 96_____ Pass 240 C. P. S.
Band pass filters 77 and 97_____ Pass 330 C. P. S.
Band pass filters 78 and 98_____ Pass 30 C. P. S.
Band pass filters 79 and 99_____ Pass 40 C. P. S.
Band pass filters 80, 100 and 112_ Pass 190 C. P. S.
Band pass filters 81, 101 and 113_ Pass 285 C. P. S.
Band pass filters 82, 102 and 114_ Pass 15 C. P. S.
Band pass filters 83, 103 and 115_ Pass 10 C. P. S.
```

When the above frequency values are used it will be seen that the difference heterodyne frequency is 10 kc. and the sum heterodyne frequency is approximately 190 kc. The ratio of the sum hereterodyne frequency to the difference heterodyne frequency is, therefore, 19 to 1. To obtain the same distortion of the two sets of hyperbolas by the reference signals it is therefore necessary that the reference signal frequency used with each sum system be 19 times the reference signal frequency for the corresponding difference arrangement. That this condition is realized will be evident from the fact that when the frequency values given above are used the phase meter 108 phase compares signals of 190 C. P. S. and the phase meter 111 phase compares signals having a frequency of 10 C. P. S., such that the frequency ratio therebetween is 19 to 1. Similarily, the phase meter 109 phase compares signals having a frequency of 285 C. P. S. and the phase meter 110 phase compares signals having a frequency of 15 C. P. S., such that the frequency ratio between the two sets of signals is also 19 to 1. This arrangement prevents convergence of the widely spaced and closely spaced hyperbolas of each of the two hyperbola sets and thus causes the hyperbolas to remain in complete juxtaposition.

The three-foci position indicating system shown in Figs. 5 and 6 is in general similar to that shown in Figs. 3 and 4 and is likewise capable of providing an unambiguous position indication by means of two sets of high and low sensitivity indications. In the system of Figs. 5 and 6, however, one of the position indicating transmitting units is combined with the link or reference transmitter and the necessity of a separate reference signal receiver at the receiving unit is eliminated. The transmitting system, as shown in Fig. 5, comprises three spaced position signal transmitting units 116, 117 and 118, the unit 118 also serving as a reference signal transmitting unit. As shown in Fig. 5, the transmitting unit 116 is provided with a plurality of transmitters 116a, 116b and 116c for radiating position indicating carrier waves at frequencies of 99.825 kilocycles, 90.105 kilocycles, and 89.725 kilocycles, respectively. The transmitting unit 117 is provided with transmitters 117a, 117b and 117c for radiating position indicating carrier waves at frequencies of 100.100 kilocycles, 89.855 kilocycles and 90.070 kilocycles, respectively, and the transmitting unit 118 is provided with transmitters 118a and 118b for radiating position indicating carrier waves at frequencies of 100.000 kilocycles and 90.000 kilocycles, respectively.

The transmitter 118b, which also serves as the reference signal transmitter, comprises a 90 kilocycle carrier wave generator or oscillator 119, a modulator 120, and a power amplifier 121 whereby the carrier wave radiated thereby may include reference signals as modulation components thereon. The transmitting unit 118, which serves the dual purpose of a position signal transmitting unit and a link or reference signal transmitting unit, comprises a pair of fixed-tuned receivers 122 and 123, a plurality of band pass filters 124 to 133, inclusive, and a plurality of mixers or heterodyning means 134, 135, 136 and 137. The receiver 122 is center tuned to a frequency of 100.000 kilocycles and is sharply selective to the carrier waves of 99.825 kilocycles, 100.000 kilocycles and 100.100 kilocycles, respectively radiated by the transmitters 116a, 118a and 117a. The construction of the receiver 122 is such that the difference or beat frequencies between the pairs of carrier waves are reproduced in the audio frequency section of the receiver and appear in the output circuits thereof as beat frequency signals having frequencies of 100 cycles and 175 cycles, as more particularly described in connection with the receiver 72 in Fig. 3, the 100 cycle and 175 cycle signals being respectively separated out by the band pass filters 124 and 125. The 100 cycle beat frequency signal from band pass filter 124 is supplied in parallel to the mixers or heterodyning means 134 and 137, while the 175 cycle beat frequency signal from the band pass filter 125 is supplied in parallel to the mixers 135 and 136.

The receiver 123 is center tuned to a frequency of 90.000 kilocycles and is sharply selective to all of the carrier waves radiated from the transmitters 116b, 117b, 118b, 116c and 117c. The construction of the receiver 123 is such that the beat frequencies between various pairs of the carrier waves received thereby are reproduced in the audio section thereof and supplied to the various band pass filters 126, 127, 128 and 129. These band pass filters are constructed to pass only the frequencies which correspond to the beat frequencies between the 90.000 kilocycle carrier wave radiated by the transmitter 118b and the respective carrier waves radiated by the other transmitters 116b, 116c, 117b and 117c. Thus the band pass filter 126 passes the 70 cycle beat frequency signal representative of the beat frequency between the carriers of the transmitters 118b and 117c; the band pass filter 127 passes the 105 cycle beat frequency signal representative of the beat frequency between the carriers radiated by the transmitters 118b and 116b; the band pass filter 128 passes the 275 cycle beat frequency signal representative of the beat frequency between the carriers radiated by the transmitters 118b and 116c; and the band pass filter 129 passes the 145 cycle beat frequency signal representative of the beat frequency between the carriers radiated by the transmitter 118b and the transmitter 117b.

The 70 cycle beat frequency signal is delivered from the band pass filter 126 to the mixer 134, wherein it is heterodyned with the 100 cycle beat frequency signal from the band pass filter 124 to produce a 30 cycle signal which is delivered through the band pass filter 130 to a frequency multiplier 138, where it is multiplied by three to provide a reference signal having a frequency of 90 cycles, which is in turn delivered to the modulator 120 of the transmitter 118b. Similarly, the 105 cycle beat frequency signal from the band pass filter 127 is delivered to the mixer 135, where it is heterodyned with the 175 cycle beat frequency signal from the band pass filter 125 to produce a 70 cycle signal which is delivered through the band pass filter 131 to the multiplier 138 to provide a reference signal of 210 cycles which is applied to the modulator 120. In a similar manner the 275 cycle beat frequency signal and the 145 cycle beat frequency signal are delivered from the band pass filters 128 and 129 to the mixers 136 and 137, where they are respectively heterodyned with the 175 cycle and 100 cycle beat frequency signals from the band pass filters 125 and 124 to produce 100 cycle and 45 cycle reference signals which are supplied through the band pass filters 132 and 133 to the frequency multiplier 138 to produce reference signals of 300 cycles and 135 cycles, respectively, which are applied to the modulator 120. Thus it will be seen that four reference signals having widely separated frequencies of 90 cycles, 210 cycles, 300 cycles and 135 cycles are modulated on the 90 kilocycle carrier wave for radiation from the transmitter 118b to the mobile receiving unit 139 of Fig. 6, the transmitter 118b thus serving both as a position signal transmitter and as a reference signal transmitter.

The equipment at the mobile receiving unit 139, as shown in Fig. 6, comprises a plurality of receivers 140 and 141, which are respectively fixed tuned to carrier frequencies of 100 kilocycles and 90 kilocycles. Thus, the receiver 140 is sharply selective to the position indicating carrier wave signals radiated from the transmitters 116a, 117a and 118a, and the receiver 141 is sharply selective to the position indicating carrier wave signals radiated from the transmitters 116b, 117b, 118b, 116c and 117c, the carrier wave from the transmitter 118b being modulated as explained above with the four distinct reference signals.

In addition to the receivers 140 and 141, the receiving unit 139 includes a pair of frequency multipliers 142 and 143, a plurality of band pass filters 144 to 157, inclusive, a plurality of mixers or heterodyning means 158, 159, 160 and 161, and a plurality of phase meters 162, 163, 164 and 165. Except for the presence of the frequency multipliers 142 and 143, the band pass filters 144 to 153, inclusive, and the mixers 158 to 161, inclusive, function as described in detail in connection with the system of Figs. 3 and 4 to provide a plurality of beat frequency position indicating signals which are delivered to the phase meters 162 to 165, inclusive.

More particularly, the 100 cycle and 175 cycle beat frequency signals which are produced in the receiver 140 by heterodyning the carriers from the transmitters 116a, 117a and 118a in pairs, are multiplied in the frequency multiplier 142 to provide a pair of beat frequency signals having frequencies multiplied by three, i. e., 300 cycles and 525 cycles, the 300 cycle beat frequency signal being supplied in parallel to the mixers 158 and 161 and the 525 cycle being supplied in parallel to the mixers 159 and 160. Likewise, the beat frequency signals produced in the receiver 141 by heterodyning the carrier wave signal from the transmitter 118b with each of the carrier wave signals received from the transmitters 116b, 116c, 117b and 117c, which beat frequency signals have frequencies, respectively, of 70 cycles, 105 cycles, 275 cycles and 145 cycles, are multiplied in the frequency multiplier 143 and delivered to the band pass filters 146 to 149, inclusive, in the form of beat frequency signals having frequencies of 210 cycles, 315 cycles, 825 cycles and 435 cycles, respectively. From the band pass filters 146 and 149 the 210 cycle and 435 cycle signals are delivered to the mixers 158 and 161, respectively, where they are heterodyned with the 300 cycle signal from the band pass filter 144 to produce position indicating signals of 90 cycles and 135 cycles, which are respectively passed through the band pass filters 150 and 153 to the phase meters 162 and 165. Similarly, the 315 cycle and the 825 cycle signals are delivered from the band pass filters 147 and 148 to the mixers 159 and 160, where they are heterodyned with the 525 cycle signal from the band pass filter 145 to produce position indicating signals having frequencies of 210 cycles and 300 cycles, respectively, which are passed through the band pass filters 151 and 152 to the phase meters 163 and 164.

In addition to the beat frequency signals produced by heterodyning the various carrier waves to which it is receptive, the receiver 141, which is of the amplitude modulation type, is effective to reproduce in its output circuit the four reference signals of 90 cycles, 210 cycles, 300 cycles and 135 cycles transmitted as modulation components on the carrier wave radiated by the transmitter 118b, and these four reference signals are transmitted through the band pass filters 154, 155, 156 and 157 to the respective opposite terminals of the phase meters 162, 163, 164 and 165, whereby the phase meters function to measure the phase relationship between the respective pairs of position indicating and reference signals of equal frequency that are supplied thereto. As was the case in the system of Figs. 3 and 4, the phase meters 162 and 165 of the mobile receiving unit 139 function to produce low and high phase sensitivity indications of the position of the mobile receiving unit 139 relative to the spaced transmitting units 117 and 118, and the phase meters 164 and 163 respectively function to produce low and high phase sensitivity indications of the position of the mobile receiving unit 139 relative to the spaced transmitting units 116 and 118. While the operation of the system shown in Figs.

5 and 6 is thus fundamentally the same as that of the system of Figs. 3 and 4, the use of a separate reference signal transmitter and receiver is eliminated in the system of Figs. 5 and 6, the frequency multipliers 138, 142 and 143 being provided to insure proper frequency separation of the various beat frequency reference and position indicating signals at the mobile receiving unit.

The three-foci position indicating system shown in Figs. 7 and 8 is likewise similar to that shown in Figs. 3 and 4 in that it provides an unambiguous position indication by means of two sets of high and low sensitivity indications. Different arrangements of the various transmitters and different carrier wave frequencies, however, are employed. The transmitting system, as shown in Fig. 7, comprises three spaced position signal transmitting units 166, 167 and 168 and a link or reference signal transmitting unit 169 for transmitting carrier wave signals to the mobile receiving unit of Fig. 8.

The transmitting unit 166 is provided with a plurality of transmitters 166a and 166b for radiating position indicating carrier waves at frequencies of 100.150 kilocycles and 90.250 kilocycles, respectively; the transmitting unit 167 is provided with the transmitters 167a, 167b and 167c for radiating position indicating carrier waves at frequencies of 90.375 kilocycles, 90.000 kilocycles and 100.000 kilocycles, respectively; and the transmitting unit 168 includes transmitters 168a and 168b for radiating position indicating carrier waves at frequencies of 100.125 kilocycles and 90.175 kilocycles, respectively. The link or reference signal transmitting unit 169 includes a reference signal transmitter 170 which comprises a 95 kilocycle carrier wave generator or oscillator 171, a modulator 172 and a power amplifier 173, whereby suitable reference signals may be modulated upon the 95 kilocycle reference signal carrier wave for transmission to the mobile receiving unit 174 of Fig. 8.

In order to produce the desired reference signals for modulation on the carrier wave of the transmitter 170, the transmitting unit 169 is provided with a pair of fixed-tuned continuous-wave receivers 175 and 176, a plurality of band pass filters 177 to 186, inclusive, and a plurality of mixers or heterodyning means 187, 188, 189 and 190. The receiver 175 is center tuned to a fixed frequency of 100.125 kilocycles and, as indicated in Fig. 7, is sharply selective to the carrier waves of 100.150 kilocycles, 100.000 kilocycles and 100.125 kilocycles, respectively radiated by the transmitters 166a, 167c and 168a, whereby beat frequency signals equal to the beat frequencies between the pairs of carrier waves from the transmitters 167c—168a and 167c—166a are produced at the receiver output, i. e., frequencies of 125 cycles and 150 cycles. These beat frequency signals are respectively passed by the band pass filters 177 and 178, the 125 cycle signal being delivered in parallel to the mixers 187 and 190 and the 150 cycle signal being delivered in parallel to the mixers 188 and 189.

The receiver 176 is sharply selective to the carrier waves of 90.250 kilocycles, 90.375 kilocycles, 90.000 kilocycles and 90.175 kilocycles from the transmitters 166b, 167a, 167b and 168b and is effective to reproduce in the audio section thereof a plurality of beat frequency signals having frequencies respectively representative of the beat frequencies between the pairs of carrier waves radiated from the pairs of transmitters 167b—168b, 167b—166b, 167a—166b and 167a—168b, i. e., 175 cycles, 250 cycles, 125 cycles and 200 cycles respectively. These beat frequency signals are respectively passed by the band pass filters 179 to 182, inclusive, and delivered to the mixers 187 to 190, inclusive, for heterodyning with the previously referred to signals of 125 cycles and 150 cycles. Thus, the band pass filter 179 delivers the 175 cycle beat frequency signal to the mixer 187 for heterodyning with the 125 cycle signal from the filter 177 to produce a 50 cycle reference signal which is delivered to the modulator 172 of the reference signal transmitter 170 through the band pass filter 183, and the band pass filter 182 delivers the 200 cycle beat frequency signal to the mixer 190 for heterodyning with the 125 cycle signal to produce a 75 cycle reference signal which is delivered to the modulator 172 through the band pass filter 186. Similarly the 250 cycle and 125 cycle signals from the band pass filters 180 and 181 are heterodyned in the mixers 188 and 189 with the 150 cycle signal from the band pass filter 178 to produce reference signals of 100 cycles and 25 cycles respectively which are passed to the modulator 172 through the filters 184 and 185. Thus four reference signals, having frequencies of 50 cycles, 100 cycles, 25 cycles, and 75 cycles, are modulated on the 95 kilocycle carrier wave for radiation from the reference signal transmitter 170 to the mobile receiving unit 174.

The equipment at the mobile receiving unit 174 (Fig. 8) comprises a plurality of receivers 191, 192 and 193 which are respectively center tuned to carrier frequencies of 100.125 kilocycles, 90.187 kilocycles and 95 kilocycles. The receiver 193 is of the amplitude modulation type and is sharply selective to the modulated 95 kilocycle carrier wave radiated by the reference signal transmitter 170. The receivers 191 and 192 are respectively sharply receptive to the carrier waves from the transmitters 166a, 167c and 168a and from the transmitters 166b, 167b, 167a and 168b. Associated with the receivers 191 and 192 are a plurality of band pass filters 194 to 203, inclusive, which correspond in function and arrangement to the band pass filters 177 to 186, inclusive, at the link transmitting unit 169, and a plurality of mixers or heterodyning means 204, 205, 206 and 207 which correspond in function and arrangement to the mixers 187 to 190, inclusive, at the link transmitting unit.

It will be apparent from the foregoing description of the equipment at the link transmitting unit 169 that the receivers 191 and 192, the band pass filters 194 to 203, inclusive, and the mixer or heterodyning means 204 to 207, inclusive, function to provide a plurality of beat frequency position indicating signals having frequencies of 50 cycles, 100 cycles, 25 cycles and 75 cycles, respectively, which are delivered from the band pass filters 200, 201, 202 and 203 to a plurality of phase meters 208, 209, 210 and 211. In the reference signal receiver 193 the modulated reference signal carrier wave received from the transmitter 170 is received and the four modulation components of 50 cycles, 100 cycles, 25 cycles and 75 cycles are reproduced at the output terminals of the receiver 193 and supplied through suitable band pass filters 212, 213, 214 and 215 to the respective opposite terminals of the phase meters 208 to 211, inclusive, whereby the phase meters function to measure the phase relationship between the respective pairs of position indicating and reference signals of equal frequency supplied thereto.

As explained in connection with the system of Figs. 5 and 6, the phase meters 208 and 211 respectively function to produce low and high phase sensitivity indications of the position of the mobile receiving unit 174 relative to the spaced transmitting units 167 and 168, and the phase meters 209 and 210 respectively function to produce low and high phase sensitivity indications of the position of the mobile receiving unit 174 relative to the spaced transmitting units 167 and 166.

More particularly, the 50 cycle position indicating signal with which the phase meter 208 is energized is derived from the 125 cycle and 175 cycle beat frequency signals respectively provided by the receivers 191 and 192, and, as heretofore explained, the 125 cycle beat frequency signal constitutes the beat frequency between the carrier waves radiated by the transmitters 167c and 168a, while the 175 cycle beat frequency signal represents the beat frequency between the carrier waves radiated by the transmitters 167b and 168b. Consequently the phase sensitivity of the 50 cycle position indicating signal corresponds to the first condition of operation described in connection with Fig. 1 and is determined by the difference between the mean frequencies of the two pairs of transmitters 167c, 168a and 167b, 168b, the transmitter of higher frequency in each pair being located at the same transmitting unit, i. e., unit 168. Accordingly, since the difference between the mean frequencies of the pair of carrier waves is approximately 10 kilocycles, each complete rotation of the phase meter 208 will indicate approximately 10 miles of movement of the mobile receiving unit 174 along a line joining the transmitting units 167 and 168.

On the other hand, the 75 cycle position indicating signal with which the phase meter 211 is energized is derived from the 125 cycle and the 200 cycle beat frequency signals respectively produced at the receivers 191 and 192, but in this case the 200 cycle beat frequency signal represents the beat frequency between the carrier wave signals transmitted by the transmitters 167a and 168b. The phase sensitivity of the 75 cycle position indicating signal accordingly corresponds to the second operating condition described in connection with Fig. 1 and is determined by the sum of the mean frequencies of the two pairs of transmitters 167c, 168a and 167a, 168b, the transmitter of higher frequency in each pair being located at different transmitting units. Consequently one complete revolution of the phase meter 211 will indicate approximately one-half mile of movement of the mobile receiving unit 174 along a line joining the transmitting units 167 and 168.

A similar analysis of the derivation of the 100 cycle and 25 cycle position indicating signals by which the phase meters 209 and 210 are energized will show that the phase meter 210 has a phase sensitivity determined by the sum of the mean frequencies between the pairs of transmitting units 167c, 166a and 167a, 166b, thus providing a high phase sensitivity indication wherein each complete revolution of the phase meter 210 indicates a movement of approximately one-half mile along a line joining the transmitters 166 and 167. Similarly, the phase sensitivity of the 100 cycle signal is determined by the difference in the mean frequencies of the carrier waves radiated by the pairs of transmitters 167c, 166a and 167b, 166b, whereby one complete revolution of the phase meter 209 indicates approximately ten miles of movement of the mobile receiving unit 174 along the same base line.

From the above explanation it will be understood that the present invention provides improved radio location systems in which the problems of phase synchronization and of elimination of ambiguity are satisfactorily solved while employing carrier frequencies suitable for efficient long range propagation.

While particular embodiments of the invention have been shown, it will be understood, of course, that the invention is not limited thereto since many modifications may be made and it is therefore contemplated by the appended claims to cover any such modifications as fall within the true spirit and scope of the invention.

What is claimed and desired to be secured by Letters Patent is:

1. A wave signal transmission system comprising, a pair of spaced transmitting units, a plurality of pairs of transmitters for radiating signals of different frequencies, said transmitters of each pair being respectively disposed at different transmitting units, a plurality of heterodyning means respectively responsive to pairs of signals derived from said pairs of transmitters to produce beat frequency signals having frequencies respectively representative of the beat frequencies between the pairs of signals radiated by said pairs of transmitters, and other heterodyning means responsive to said beat frequency signals for producing at least one beat frequency reference signal having a frequency representative of the beat frequency between at least one pair of said first mentioned beat frequency signals.

2. A wave signal transmission system comprising, a pair of spaced transmitting units, a plurality of pairs of transmitters for radiating signals of different frequencies, said transmitters of each pair being respectively disposed at different transmitting units, a plurality of heterodyning means respectively responsive to pairs of signals derived from said pairs of transmitters to produce beat frequency signals having frequencies respectively representative of the beat frequencies between the pairs of signals radiated by said pairs of transmitters, other heterodyning means responsive to said beat frequency signals for producing at least one beat frequency reference signal having a frequency representative of the beat frequency between at least one pair of said first mentioned beat frequency signals, and means for modulating said reference signal upon a carrier for space radiation.

3. A wave signal transmission system comprising a pair of spaced transmitting units, a first pair of transmitters including a transmitter at each of said units for radiating a first pair of signals at different frequencies, a second pair of transmitters including a transmitter at each of said units for radiating a second pair of signals at different frequencies, each of said transmitters at one of said units radiating signals of higher frequency than the transmitter of that pair at the other of said units, a pair of heterodyning means respectively responsive to said pairs of signals to produce a pair of beat frequency signals having frequencies respectively representative of the beat frequencies between the signals of said first pair and between the signals of said second pair, and other heterodyning means responsive to said pair of beat frequency signals for producing a reference signal representative of the beat frequency between said pair of beat frequency signals.

4. A wave signal transmission system comprising a pair of spaced transmitting units, a first pair of transmitters including a transmitter at each of said units for radiating a first pair of signals at different frequencies, a second pair of transmitters including a transmitter at each of said units for radiating a second pair of signals at different frequencies, each of said transmitters at one of said units radiating signals of higher frequency than the transmitter of that pair at the other of said units, a pair of heterodyning means respectively responsive to said pairs of signals to produce a pair of beat frequency signals having frequencies respectively representative of the beat frequencies between the signals of said first pair and between the signals of said second pair, other heterodyning means responsive to said pair of beat frequency signals for producing a reference signal representative of the beat frequency between said pair of beat frequency signals, and means for modulating said reference signal upon a carrier for space radiation.

5. A wave signal transmission system comprising a pair of spaced transmitting units, a first pair of transmitters including a transmitter at each of said units for radiating a first pair of signals at different frequencies, a second pair of transmitters including a transmitter at each of said units for radiating a second pair of signals at different frequencies, the transmitter of said first pair at one of said units radiating signals of higher frequency than the transmitter of said first pair at the other of said units, the transmitter of said second pair at said one unit radiating signals of lower frequency than the transmitter of said second pair at said other unit, a pair of heterodyning means respectively responsive to said pairs of signals to produce a pair of beat frequency signals having frequencies respectively representative of the beat frequencies between the signals of said first pair and between the signals of said second pair, and other heterodyning means responsive to said pair of beat frequency signals for producing a reference signal representative of the beat frequency between said pair of beat frequency signals.

6. A wave signal transmission system comprising a pair of spaced transmitting units, a first pair of transmitters including a transmitter at each of said units for radiating a first pair of signals at different frequencies, a second pair of transmitters including a transmitter at each of said units for radiating a second pair of signals at different frequencies, the transmitter of said first pair at one of said units radiating signals of higher frequency than the transmitter of said first pair at the other of said units, the transmitter of said second pair at said one unit radiating signals of lower frequency than the transmitter of said second pair at said other unit, a pair of heterodyning means respectively responsive to said pairs of signals to produce a pair of beat frequency signals having frequencies respectively representative of the beat frequencies between the signals of said first pair and between the signals of said second pair, other heterodyning means responsive to said pair of beat frequency signals for producing a reference signal representative of the beat frequency between said pair of beat frequency signals, and means for modulating said reference signal upon a carrier for space radiation.

7. A wave signal transmission system comprising a pair of spaced transmitting units, three pairs of transmitters for radiating pairs of signals of different frequencies, one transmitter of each pair being disposed at one of said units and the other transmitter of each pair being disposed at the other of said units, first heterodyning means responsive to a first pair of said signals for producing a first reference signal having a frequency representative of the beat frequency between the signals of said first pair, other heterodyning means responsive to a second and a third pair of said signals to produce a pair of beat frequency signals having frequencies respectively representative of the beat frequencies between the signals of said second pair and between the signals of said third pair, means controlled by said first reference signal and one of said beat frequency signals to produce a second reference signal, and means controlled by said first reference signal and the other of said beat frequency signals to produce a third reference signal.

8. A wave signal transmission system comprising a pair of spaced transmitting units, three pairs of transmitters for radiating pairs of signals of different frequencies, one transmitter of each pair being disposed at one of said units and the other transmitter of each pair being disposed at the other of said units, first heterodyning means responsive to a first pair of said signals for producing a first reference signal having a frequency representative of the beat frequency between the signals of said first pair, other heterodyning means responsive to a second and a third pair of said signals to produce a pair of beat frequency signals having frequencies respectively representative of the beat frequencies between the signals of said second pair and between the signals of said third pair, means controlled by said first reference signal and one of said beat frequency signals to produce a second reference signal, means controlled by said first reference signal and the other of said beat frequency signals to produce a third reference signal, and means for modulating all of said reference signals upon a common carrier for space radiation.

9. A wave signal transmitting system comprising, three spaced position signal transmitting units, a plurality of transmitters at each of said units for radiating position signals of different frequencies, heterodyning means responsive to signals derived from one of said transmitters at each of said units for heterodyning said derived signals in pairs to produce a first pair of beat frequency signals having frequencies respectively representative of the beat frequencies between signals radiated by said one transmitter at one of said units and by said one of said transmitters at each of the others of said units, heterodyning means responsive to signals derived from others of said transmitters at said units for heterodyning said last mentioned derived signals in pairs to produce a second pair of beat frequency signals having frequencies respectively representative of beat frequencies between different pairs of signals radiated by transmitters at said one unit and at a second of said units and to produce a third pair of beat frequency signals having frequencies respectively representative of beat frequencies between different pairs of signals radiated by transmitters at said one unit and at a third of said units, means controlled by one beat frequency signal of said first pair and by said second pair of beat frequency signals for producing a first pair of reference signals, and means controlled by the other beat frequency signal of said first pair and by said third pair of beat frequency signals for producing a second pair of reference signals.

10. A wave signal transmitting system comprising, three spaced position signal transmitting units, a plurality of transmitters at each of said units for radiating position signals of different frequencies, heterodyning means responsive to signals derived from one of said transmitters at each of said units for heterodyning said derived signals in pairs to produce a first pair of beat frequency signals having frequencies respectively representative of the beat frequencies between signals radiated by said one transmitter at one of said units and by said one of said transmitters at each of the others of said units, heterodyning means responsive to signals derived from others of said transmitters at said units for heterodyning said last mentioned derived signals in pairs to produce a second pair of beat frequency signals having frequencies respectively representative of beat frequencies between different pairs of signals radiated by transmitters at said one unit and at a second of said units and to produce a third pair of beat frequency signals having frequencies respectively representative of beat frequencies between different pairs of signals radiated by transmitters at said one unit and at a third of said units, means controlled by one beat frequency signal of said first pair and by said second pair of beat frequency signals for producing a first pair of reference signals, means controlled by the other beat frequency signal of said first pair and by said third pair of beat frequency signals for producing a second pair of reference signals, and means excited by all of said reference signals for modulating a space radiated common carrier.

11. A wave signal transmission system comprising, three spaced position signal transmitting units, a plurality of transmitters at each of said units for radiating position signals of different frequencies, heterodyning means responsive to signals derived from one of said transmitters at each of said units for heterodyning said derived signals in pairs to produce a first pair of beat frequency signals having frequencies respectively representative of beat frequencies between signals radiated by said one transmitter at one of said units and by said one of said transmitters at each of the others of said units, heterodyning means responsive to signals derived from a second transmitter at said one unit and from second and third transmitters at each of said other units for heterodyning said last mentioned derived signals in pairs to produce a second pair of beat frequency signals having frequencies respectively representative of beat frequencies between signals radiated by said second transmitter at said one unit and said second and third transmitters at a second of said units and to produce a third pair of beat frequency signals having frequencies respectively representative of beat frequencies between signals radiated by said second transmitter at said one unit and said second and third transmitters at the third of said units, means controlled by one beat frequency signal of said first pair and by said second pair of beat frequency signals for producing a first pair of reference signals, and means controlled by the other beat frequency signal of said first pair and by said third pair of beat frequency signals for producing a second pair of reference signals.

12. A wave signal transmission system comprising, three spaced position signal transmitting units, a plurality of transmitters at each of said units for radiating position signals of different frequencies, heterodyning means responsive to signals derived from one of said transmitters at each of said units for heterodyning said derived signals in pairs to produce a first pair of beat frequency signals having frequencies respectively representative of beat frequencies between signals radiated by said one transmitter at one of said units and by said one of said transmitters at each of the others of said units, heterodyning means responsive to signals derived from a second transmitter at said one unit and from second and third transmitters at each of said other units for heterodyning said last mentioned derived signals in pairs to produce a second pair of beat frequency signals having frequencies respectively representative of beat frequencies between signals radiated by said second transmitter at said one unit and said second and third transmitters at a second of said units and to produce a third pair of beat frequency signals having frequencies respectively representative of beat frequencies between signals radiated by said second transmitter at said one unit and said second and third transmitters at the third of said units, means controlled by one beat frequency signal of said first pair and by said second pair of beat frequency signals for producing a first pair of reference signals, means controlled by the other beat frequency signal of said first pair and by said third pair of beat frequency signals for producing a second pair of reference signals, and means excited by all of said reference signals for modulating a space radiated common carrier.

13. A wave signal transmission system comprising, three spaced position signal transmitting units, a plurality of transmitters at each of said units for radiating position signals of different frequencies, heterodyning means responsive to signals derived from one of said transmitters at each of said units for heterodyning said derived signals in pairs to produce a first pair of beat frequency signals having frequencies respectively representative of beat frequencies between signals radiated by said one transmitter at one of said units and by said one of said transmitters at each of the others of said units, heterodying means responsive to signals derived from a second transmitter at said one unit and from second and third transmitters at each of said other units for heterodyning said last mentioned derived signals in pairs to produce a second pair of beat frequency signals having frequencies respectively representative of beat frequencies between signals radiated by said second transmitter at said one unit and said second and third transmitters at a second of said units and to produce a third pair of beat frequency signals having frequencies respectively representative of beat frequencies between signals radiated by said second transmitter at said one unit and said second and third transmitters at the third of said units, heterodyning means responsive to one of said first pair of beat frequency signals and to said second pair of beat frequency signals for heterodyning said one signal of said first pair with each of the signals of said second pair to produce a first pair of reference signals, and heterodyning means responsive to the other of said first pair of beat frequency signals and to said third pair of beat frequency signals for heterodyning said other signal of said first pair with each of the signals of said third pair to produce a second pair of reference signals.

14. A wave signal transmission system comprising, three spaced position signal transmitting units, a plurality of transmitters at each of said units for radiating position signals of different frequencies, heterodyning means responsive to signals derived from one of said transmitters at each of said units for heterodyning said derived signals in pairs to produce a first pair of beat frequency signals having frequencies respectively representative of beat frequencies between signals radiated by said one transmitter at one of said units and by said one of said transmitters at each of the others of said units, heterodyning means responsive to signals derived from a second transmitter at said one unit and from second and third transmitters at each of said other units for heterodyning said last mentioned derived signals in pairs to produce a second pair of beat frequency signals having frequencies respectively representative of beat frequencies between signals radiated by said second transmitter at said one unit and said second and third transmitters at a second of said units and to produce a third pair of beat frequency signals having frequencies respectively representative of beat frequencies between signals radiated by said second transmitter at said one unit and said second and third transmitters at the third of said units, means controlled by one beat frequency signal of said first pair and by said second pair of beat frequency signals for producing a first pair of reference signals, means controlled by the other beat frequency signal of said first pair and by said third pair of beat frequency signals for producing a second pair of reference signals, and means for modulating upon a common carrier a plurality of reference signals having frequencies respectively related to the frequencies of said first and second pairs of reference signals.

15. A wave signal transmission system comprising, three spaced position signal transmitting units, a plurality of transmitters at each of said units for radiating position signals of different frequencies, heterodyning means responsive to signals derived from one of said transmitters at each of said units for heterodyning said derived signals in pairs to produce a first pair of beat frequency signals having frequencies respectively representative of beat frequencies between signals radiated by said one transmitter at one of said units and by said one of said transmitters at each of the others of said units, heterodyning means responsive to signals derived from a second transmitter at said one unit and from second and third transmitters at each of said other units for heterodyning said last mentioned derived signals in pairs to produce a second pair of beat frequency signals having frequencies respectively representative of beat frequencies between signals radiated by said second transmitter at said one unit and said second and third transmitters at a second of said units and to produce a third pair of beat frequency signals having frequencies respectively representative of beat frequencies between signals radiated by said second transmitter at said one unit and said second and third transmitters at the third of said units, means controlled by one beat frequency signal of said first pair and by said second pair of beat frequency signals for producing a first pair of reference signals, means controlled by the other beat frequency signal of said first pair and by said third pair of beat frequency signals for producing a second pair of reference signals, and means for modulating the position signal radiated by one of said transmitters with a plurality of reference signals having frequencies respectively related to the frequencies of said first and second pairs of reference signals.

16. A wave signal transmission system comprising, three spaced position signal transmitting units, a plurality of transmitters at each of said units for radiating position signals of different frequencies, heterodyning means responsive to signals derived from one of said transmitters at each of said units for heterodyning said derived signals in pairs to produce a first pair of beat frequency signals having frequencies respectively representative of beat frequencies between signals radiated by said one transmitter at one of said units and by said one of said transmitters at each of the others of said units, heterodyning means responsive to signals derived from a second transmitter at said one unit and from second and third transmitters at each of said other units for heterodyning said last mentioned derived signals in pairs to produce a second pair of beat frequency signals having frequencies respectively representative of beat frequencies between signals radiated by said second transmitter at said one unit and said second and third transmitters at a second of said units and to produce a third pair of beat frequency signals having frequencies respectively representative of beat frequencies between signals radiated by said second transmitter at said one unit and said second and third transmitters at the third of said units, means controlled by one beat frequency signal of said first pair and by said second pair of beat frequency signals for producing a first pair of reference signals, means controlled by the other beat frequency signal of said first pair and by said third pair of beat frequency signals for producing a second pair of reference signals, and means for modulating the position signals radiated by one of said transmitters at said one unit with a plurality of reference signals having frequencies respectively related to the frequencies of said first and second pairs of reference signals.

17. A wave signal transmission system comprising, three spaced position signal transmitting units, a plurality of transmitters at each of said units for radiating position signals of different frequencies, heterodyning means responsive to signals derived from one of said transmitters at each of said units for heterodyning said derived signals in pairs to produce a first pair of beat frequency signals having frequencies respectively representative of beat frequencies between signals radiated by said one transmitter at one of said units and by said one of said transmitters at each of the others of said units, heterodyning means responsive to signals derived from a second transmitter at said one unit and from second and third transmitters at each of said other units for heterodyning said last mentioned derived signals in pairs to produce a second pair of beat frequency signals having frequencies respectively representative of beat frequencies between signals radiated by said second transmitter at said one unit and said second and third transmitters at a second of said units and to produce a third pair of beat frequency signals having frequencies respectively representative of beat frequencies between signals radiated by said second transmitter at said one unit and said second and third transmitters at the third of said units, means controlled by one beat frequency signal of said first pair and by said second pair of beat frequency signals for producing a first pair of reference signals, means controlled by the other beat frequency signal of said first pair and by said third pair of beat frequency signals for producing a second pair of reference signals, frequency multiplying means excited by said first and second pairs of reference signals for producing a plurality of reference signals of higher frequencies, and means for modulating said higher frequency reference signals on a common carrier.

18. A wave signal transmission system comprising, three spaced position signal transmitting units, a plurality of transmitters at each of said units for radiating position signals of different frequencies, heterodyning means responsive to signals derived from one of said transmitters at each of said units for heterodyning said derived signals in pairs to produce a first pair of beat frequency signals having frequencies respectively representative of beat frequencies between signals radiated by said one transmitter at one of said units and by said one of said transmitters at each of the others of said units, heterodyning means responsive to signals derived from a second transmitter at said one unit and from second and third transmitters at each of said other units for heterodyning said last mentioned derived signals in pairs to produce a second pair of beat frequency signals having frequencies respectively representative of beat frequencies between signals radiated by said second transmitter at said one unit and said second and third transmitters at a second of said units and to produce a third pair of beat frequency signals having frequencies respectively representative of beat frequencies between signals radiated by said second transmitter at said one unit and said second and third transmitters at the third of said units, means controlled by one beat frequency signal of said first pair and by said second pair of beat frequency signals for producing a first pair of reference signals, means controlled by the other beat frequency signal of said first pair and by said third pair of beat frequency signals for producing a second pair of reference signals, frequency multiplying means excited by said first and second pairs of reference signals for producing a plurality of reference signals of higher frequencies, and means for modulating the position signals radiated by one of said transmitters with said higher frequency reference signals.

19. A wave signal transmitting system comprising, three spaced position signal transmitting units, a plurality of transmitters at each of said units for radiating position signals of different frequencies, heterodyning means responsive to signals derived from one of said transmitters at each of said units for heterodyning said derived signals in pairs to produce a first pair of beat frequency signals having frequencies respectively representative of the beat frequencies between signals radiated by said one transmitter at one of said units and by said one of said transmitters at each of the others of said units, heterodyning means responsive to signals derived from others of said transmitters at said units for heterodyning said last mentioned derived signals in pairs to produce a second pair of beat frequency signals having frequencies respectively representative of beat frequencies between different pairs of signals radiated by transmitters at said one unit and at a second of said units and to produce a third pair of beat frequency signals having frequencies respectively representative of beat frequencies between different pairs of signals radiated by transmitters at said one unit and at a third of said units, means controlled by one beat frequency signal of said first pair and by said second pair of beat frequency signals for producing a first pair of reference signals, means controlled by the other beat frequency signal of said first pair and by said third pair of beat frequency signals for producing a second pair of reference signals, and means for modulating all of said reference signals upon a common carrier for space radiation.

20. Wave signal receiving apparatus for translating received space radiated signals into position indications comprising, a plurality of receivers for respectively receiving pairs of space radiated signals and for heterodyning said received pairs to produce beat frequency signals having frequencies respectively representative of the beat frequencies between the signals of each pair, heterodyning means responsive to said beat frequency signals for producing a position indicating heterodyne signal having a frequency representative of the beat frequency between said beat frequency signals, means for receiving and reproducing a reference signal having a frequency equal to the frequency of said heterodyne signal and modulated upon a space radiated carrier signal, and phase measuring means for measuring the phase relationship between said heterodyne and reference signals.

21. Wave signal receiving apparatus for translating received space radiated signals into position indications comprising, a plurality of receivers for respectively receiving pairs of space radiated signals and for heterodyning said received pairs to produce beat frequency signals having frequencies respectively representative of the beat frequencies between the signals of each pair, heterodyning means responsive to said beat frequency signals for producing a position indicating heterodyne signal having a frequency representative of the beat frequency between said beat frequency signals and having a sensitivity determined by the relative values of the respective average frequencies of the pairs of space radiated signals from which said beat frequency signals are derived, means for receiving and reproducing a reference signal having a frequency equal to the frequency of said heterodyne signal and modulated upon a space radiated carrier signal, and phase measuring means for measuring the phase relationship between said heterodyne and reference signals.

22. Wave signal receiving apparatus for translating received space radiated signals into position indications comprising, a plurality of wave signal receivers for respectively receiving pairs of space radiated signals and for heterodyning said pairs to produce first and second beat frequency signals having frequencies respectively representative of the beat frequencies between the signals of said pairs, one of said beat frequency signals constituting a first position-indicating heterodyne signal, heterodyning means responsive to said first and second beat frequency signals for producing a second position-indicating heterodyne signal having a frequency representative of the beat frequency between said first and second beat frequency signals and having a sensitivity different from that of said first heterodyne signal, means for receiving and reproducing first and second reference signals having frequencies respectively equal to the frequencies of said first and second heterodyne signals, and phase measuring means for respectively measuring the phase relationship between corresponding heterodyne and reference signals to provide separate position indications of different sensitivity.

23. Wave signal receiving apparatus for translating received space radiated signals into position indications comprising, a plurality of wave signal receivers for respectively receiving pairs of space radiated signals and for heterodyning said pairs to produce first and second beat frequency signals having frequencies respectively representative of the beat frequencies between the signals of said pairs, one of said beat frequency signals constituting a first position indicating heterodyne signal having a sensitivity determined by the average frequency of the radiated pair of signals from which it is derived, heterodyning means responsive to said first and second beat frequency signals for producing a second position indicating heterodyne signal having a frequency representative of the beat frequency between said first and second beat frequency signals and having a sensitivity determined by the relative values of the respective average frequencies of the pairs of radiated signals from which said first and second beat frequencies are derived, means for receiving and reproducing first and second reference signals having frequencies respectively equal to the frequencies of said first and second heterodyne signals, and phase measuring means for respectively measuring the phase relationship between corresponding heterodyne and reference signals to provide separate position indications of different sensitivity.

24. Wave signal receiving apparatus for translating received space radiated signals into position indications comprising, a plurality of wave signal receivers for respectively receiving pairs of space radiated signals and for heterodyning said pairs to produce first and second beat frequency signals having frequencies respectively representative of the beat frequencies between the signals of said pairs, one of said beat frequency signals constituting a first position indicating heterodyne signal, heterodyning means responsive to said first and second beat frequency signals for producing a second position indicating heterodyne signal having a frequency representative of the beat frequency between said first and second beat frequency signals and having a sensitivity different from that of said first heterodyne signal, means for receiving and reproducing first and second reference signals modulated on a common carrier and having frequencies respectively equal to the frequencies of said first and second heterodyne signals, a pair of phase measuring means, and band pass filter means for respectively supplying corresponding heterodyne and reference signals to said phase measuring means to provide separate position indications of different sensitivity.

25. Wave signal receiving apparatus for translating received space radiated signals into position indications comprising, a plurality of wave signal receivers for respectively receiving pairs of space radiated signals and for heterodyning said pairs to produce first, second and third beat frequency signals having frequencies respectively representative of the beat frequencies between the signals of each pair, said first beat frequency signal constituting a first position indicating heterodyne signal, heterodyning means respectively responsive in pairs to said first and second and to said first and third beat frequency signals for producing second and third position indicating heterodyne signals having frequencies respectively representative of the beat frequencies between said pairs of beat frequency signals and of different sensitivity with respect to each other and with respect to said first heterodyne signal, means for receiving and reproducing first, second and third reference signals having frequencies respectively equal to the frequencies of said first, second and third heterodyne signals, and first, second and third phase measuring means for respectively measuring the phase relationship between corresponding heterodyne and reference signals to provide three position indications of different sensitivities.

26. Wave signal receiving apparatus for translating received space radiated signals into position indications comprising, a plurality of wave signal receivers for respectively receiving pairs of space radiated signals and for heterodyning said pairs to produce first, second and third beat frequency signals having frequencies respectively representative of the beat frequencies between the signals of each pair, said first beat frequency signal constituting a first position indicating heterodyne signal, heterodyning means respectively responsive in pairs to said first and second and to said first and third beat frequency signals for producing second and third position indicating heterodyne signals having frequencies respectively representative of the beat frequencies between said pairs of beat frequency signals and of different sensitivity with respect to each other and with respect to said first heterodyne signal, means for receiving and reproducing first, second and third reference signals modulated upon a common spaced radiated carrier and having frequencies respectively equal to the frequencies of said first, second and third herteodyne signals, and first, second and third phase measuring means for respectively measuring the phase relationship between corresponding heterodyne and reference signals to provide three position indications of different sensitivities.

27. Wave signal receiving apparatus for translating received space radiated signals into position indications comprising, a plurality of wave signal receivers for respectively receiving pairs of space radiated signals and for heterodyning said pairs to produce first, second and third beat frequency signals having frequencies respectively representative of the beat frequencies between the signals of each pair, said first beat frequency signal constituting a first position indicating heterodyne signal, heterodyning means respectively responsive in pairs to said first and second and to said first and third beat frequency signals for producing second and third position indicating heterodyne signals having frequencies respectively representative of the beat frequencies between said pairs of beat frequency signals and of different sensitivity with respect to each other and with respect to said first heterodyne signal, means for receiving and reproducing first, second and third reference signals modulated upon a common space radiated carrier and having frequencies respectively equal to the frequencies of said first, second and third heterodyne signals, first, second and third phase measuring means for respectively measuring the phase relationship between corresponding heterodyne and reference signals, and band pass filter means for supplying said heterodyne and reference signals to said phase measuring means to provide three position indications of different sensitivities.

28. Wave signal receiving apparatus for translating received space radiated signals into position indications comprising, a plurality of wave signal receivers for respectively receiving pairs of space radiated signals and for heterodyning said pairs to produce first, second and third beat frequency signals having frequencies respectively representative of the beat frequencies between the signals of each pair, said first beat frequency signal constituting a first position indicating heterodyne signal having a sensitivity determined by the average frequency of the radiated pair of signals from which said first heterodyne signal is derived, heterodyning means respectively responsive in pairs to said first and second and to said first and third beat frequency signals for producing second and third position indicating heterodyne signals having frequencies respectively representative of the beat frequencies between said pairs of beat frequency signals and having sensitivities respectively determined by the relative values of the respective average frequencies of the pairs of radiated signals from which said first and second and said first and third beat frequencies are derived, means for receiving and reproducing first, second and third reference signals having frequencies respectively equal to the frequencies of said first, second and third heterodyne signals and first, second and third phase measuring means for respectively measuring the phase relationships between corresponding heterodyne and reference signals to provide three position indications of different sensitivities.

29. Wave signal receiving apparatus for translating received space radiated signals into position indications comprising a wave signal receiver for receiving a plurality of space radiated signals and for heterodyning said signals in pairs to produce a first pair of beat frequency signals having frequencies respectively representative of the beat frequencies between different pairs of said space radiated signals, other wave signal receiver means for receiving a plurality of other space radiated signals and for heterodyning said other signals in pairs to provide a second and a third pair of beat frequency signals having frequencies respectively representative of the beat frequencies between different pairs of said other space radiated signals, heterodyning means responsive to one beat frequency signal of said first pair and to said second pair of beat frequency signals for producing a first pair of position indicating heterodyne signals of different frequency and different sensitivity, other heterodyne means responsive to the other beat frequency signal of said first pair and to said third pair of beat frequency signals for producing a second pair of position indicating heterodyne signals of different frequency and different sensitivity, means for receiving and reproducing four reference signals having frequencies respectively equal to the frequencies of the four heterodyne signals constituting said first and second pair thereof, and phase measuring means for respectively measuring the phase relationship between corresponding heterodyne and reference signals.

30. Wave signal receiving apparatus for translating received space radiated signals into position indications comprising a wave signal receiver for receiving a plurality of space radiated signals and for heterodyning said signals in pairs to produce a first pair of beat frequency signals having frequencies respectively representative of the beat frequencies between different pairs of said space radiated signals, other wave signal receiver means for receiving a plurality of other space radiated signals and for heterodyning said other signals in pairs to provide a second and a third pair of beat frequency signals having frequencies respectively representative of the beat frequencies between different pairs of said other space radiated signals, heterodyning means responsive to one beat frequency signal of said first pair and to said second pair of beat frequency signals for producing a first pair of position indicating heterodyne signals of different frequency and different sensitivity, other heterodyne means responsive to the other beat frequency signal of said first pair and to said third pair of beat frequency signals for producing a second pair of position indicating heterodyne signals of different frequency and different sensitivity, means for receiving and reproducing four reference signals modulated upon a common space radiated carrier and having frequencies respectively equal to the frequencies of the four heterodyne signals constituting said first and second pair thereof, and phase measuring means for respectively measuring the phase relationship between corresponding heterodyne and reference signals.

31. A position determining system comprising a pair of spaced transmitting units, a plurality of pairs of transmitters, each pair of transmitters including a transmitter at each of said units for radiating to a receiving point position indicating signals of different frequencies, heterodyning means responsive to signals derived from said pairs of transmitters for heterodyning said signals in pairs to produce a pair of beat frequency signals and for heterodyning said pair of beat frequency signals to produce a reference signal having a frequency representative of the beat frequency between said beat frequency signals, means for modulating said reference signal upon a carrier for radiation to said receiving point, a pair of receivers at said receiving point for respectively receiving said pairs of signals radiated by said pairs of transmitters and for heterodyning said received signals in pairs to produce a pair of beat frequency signals having frequencies representative of the respective beat frequencies between the signals of said pairs of received signals and having phase sensitivities respectively determined by the values of the average frequencies of the pairs of received signals from which they are derived, heterodyning means at said receiving point responsive to said last mentioned beat frequency signals for producing a position indicating heterodyne signal having a frequency representative of the beat frequency between said last mentioned beat frequency signals and having a phase sensitivity determined by the relative values of the respective average frequencies of the pairs of radiated signals from which said last mentioned beat frequency signals are derived, means at said receiving point for receiving said reference signal modulated carrier and for producing a reference signal having a frequency equal to the frequency of said position indicating signal, and phase measuring means for measuring the phase relationship between said position indicating and reference signals.

32. A position determining system comprising a pair of spaced transmitting units, a plurality of pairs of transmitters, each pair of transmitters including a transmitter at each of said units for radiating to a receiving point position indicating signals of different frequencies, heterodyning means responsive to signals derived from said pairs of transmitters for heterodyning said signals in pairs to produce a pair of beat frequency signals and for heterodyning said pair of beat frequency signals to produce a reference signal having a frequency representative of the beat frequency between said beat frequency signals, means for modulating said reference signal upon a carrier for radiation to said receiving point, a pair of receivers at said receiving point for respectively receiving said pairs of signals radiated by said pairs of transmitters and for heterodyning said received signals in pairs to produce a pair of beat frequency signals having frequencies representative of the respective beat frequencies between the signals of said pairs of received signals and having phase sensitivities respectively determined by the values of the average frequencies of the pairs of received signals from which they are derived, heterodyning means at said receiving point responsive to said last mentioned beat frequency signals for producing a position indicating heterodyne signal having a frequency representative of the beat frequency between said last mentioned beat frequency signals and having a phase sensitivity determined by the difference between the respective average frequencies of the pairs of radiated signals from which said last mentioned beat frequency signals are derived, means at said receiving point for receiving said reference signal modulated carrier and producing a reference signal having a frequency equal to the frequency of said position indicating signal, and phase measuring means for measuring the phase relationship between said position indicating and reference signals.

33. A position determining system comprising a pair of spaced transmitting units, a plurality of pair of transmitters, each pair of transmitters including a transmitter at each of said units for radiating to a receiving point position indicating signals of different frequencies, heterodyning means responsive to signals derived from said pairs of transmitters for heterodyning said signals in pairs to produce a pair of beat frequency signals and for heterodyning said pair of beat frequency signals to produce a reference signal having a frequency representative of the beat frequency between said beat frequency signals, means for modulating said reference signal upon a carrier for radiation to said receiving point, a pair of receivers at said receiving point for respectively receiving said pairs of signals radiated by said pairs of transmitters and for heterodyning said received signals in pairs to produce a pair of beat frequency signals having frequencies representative of the respective beat frequencies between the signals of said pairs of received signals and having phase sensitivities respectively determined by the values of the average frequencies of the pairs of received signals from which they are derived, heterodyning means at said receiving point responsive to said last mentioned beat frequency signals for producing a position indicating heterodyne signal having a frequency representative of the beat frequency between said last mentioned beat frequency signals and having a phase sensitive determined by the sum of the respective average frequencies of the pairs of radiated signals from which said last mentioned beat frequency signals are derived, means at said receiving point for receiving said reference signal modulated carrier and producing a reference signal having a frequency equal to the frequency of said position indicating signal, and phase measuring means for measuring the phase relationship between said position indicating and reference signals.

34. A position determining system comprising, a pair of spaced transmitting units, a plurality of pairs of transmitters, each pair of transmitters including a transmitter at each of said units for radiating to a receiving point position indicating signals of different frequencies, the transmitters at one of said units radiating signals of higher frequency than the transmitters of the corresponding pairs at the other of said units, heterodyning means responsive to signals derived from said pairs of transmitters for heterodyning said signals in pairs to produce a pair of beat frequency signals and for heterodyning said pair of beat frequency signals to produce a reference signal having a frequency representative of the beat frequency between said beat frequency signals, means for modulating said reference signal upon a carrier for radiation to said receiving point, a pair of receivers at said receiving point for respectively receiving said pairs of signals radiated by said pairs of transmitters and for hererodyning said received signals in pairs to produce a pair of beat frequency signals having frequencies representative of the respective beat frequencies between the signals of said pairs of received signals and having phase sensitivities respectively determined by the values of the average frequencies of the pairs of received signals from which they are derived, heterodyning means at said receiving point responsive to said last mentioned beat frequency signals for producing a position indicating heterodyne signal having a frequency representative of the beat frequency between said last mentioned beat frequency signals and having a phase sensitivity determined by the difference between the respective average frequencies of the pairs of radiated signals from which said last mentioned beat frequency signals are derived, means at said receiving point for receiving said reference signal modulated carrier and producing a reference signal having a frequency equal to the frequency of said position indicating signal, and phase measuring means for measuring the phase relationship between said position indicating and reference signals.

35. A position determining system comprising, a pair of spaced transmitting units, a plurality of pairs of transmitters, each pair of transmitters including a transmitter at each of said units for radiating to a receiving point position indicating signals of different frequencies, the difference between the frequencies of one pair of signals being of opposite sign with respect to said units from the difference between the frequencies of another pair of signals, heterodyning means responsive to signals derived from said pairs of transmitters for heterodyning said signals in pairs to produce a pair of beat frequency signals and for heterodyning said pair of beat frequency signals to produce a reference signal having a frequency representative of the beat frequency between said beat frequency signals, means for modulating said reference signal upon a carrier for radiation to said receiving point, a pair of receivers at said receiving point for respectively receiving said pairs of signals radiated by said pairs of transmitters and for heterodyning said received signals in pairs to produce a pair of beat frequency signals having frequencies representative of the respective beat frequencies between the signals of said pairs of received signals and having phase sensitivities respectively determined by the values of the average frequencies of the pairs of received signals from which they are derived, heterodyning means at said receiving point responsive to said last mentioned beat frequency signals for producing a position indicating heterodyne signal having a frequency representative of the beat frequency between said last mentioned beat frequency signals and having a phase sensitivity determined by the sum of the respective average frequencies of the pairs of radiated signals from which said last mentioned beat frequency signals are derived, means at said receiving point for receiving said reference signal modulated carrier and producing a reference signal having a frequency equal to the frequency of said position indicating signal, and phase measuring means for measuring the phase relationship between said position indicating and reference signals.

36. A position determining system comprising, a pair of spaced transmitting units, a plurality of pairs of transmitters, each pair of transmitters including a transmitter at each of said units for radiating to a receiving point position indicating signals of different frequencies, the transmitters at one of said units radiating signals of respectively higher and lower frequencies than the transmitters of the corresponding pairs at the other of said units, heterodyning means responsive to signals derived from said pairs of transmitters for heterodyning said signals in pairs to produce a pair of beat frequency signals and for heterodyning said pair of beat frequency signals to produce a reference signal having a frequency representative of the beat frequency between said beat frequency signals, means for modulating said reference signal upon a carrier for radiation to said receiving point, a pair of receivers at said receiving point for respectively receiving said pairs of signals radiated by said pairs of transmitters and for heterodyning said received signals in pairs to produce a pair of beat frequency signals having frequencies representative of the respective beat frequencies between the signals of said pairs of received signals and having phase sensitivities respectively determined by the values of the average frequencies of the pairs of received signals from which they are derived, heterodyning means at said receiving point responsive to said last mentioned beat frequency signals for producing a position indicating heterodyne signal having a frequency representative of the beat frequency between said last mentioned beat frequency signals and having a phase sensitivity determined by the sum of the respective average frequencies of the pairs of radiated signals from which said last mentioned beat frequency signals are derived, means at said receiving point for receiving said reference signal modulated carrier and producing a reference signal having a frequency equal to the frequency of said position indicating signal, and phase measuring means for measuring the phase relationship between said position indicating and reference signals.

37. A position determining system comprising a pair of spaced transmitting units, a plurality of pairs of transmitters, each pair of transmitters including a transmitter at each of said units for radiating to a receiving point position indicating signals of different frequencies, first heterodyning means responsive to a pair of signals derived from a first pair of transmitters for producing a first reference signal having a frequency representative of the beat frequency between said pair of derived signals, other heterodyning means responsive to a second pair of signals derived from a second pair of transmitters for producing a beat frequency signal having a frequency representative of the beat frequency between said second pair of derived signals, heterodyne means controlled by said first reference signal and said beat frequency signal for producing a second reference signal having a frequency representative of the beat frequency between said first reference signal and said beat frequency signal, means for transmitting said reference signals as modulation components to said receiving point, a pair of receivers at said receiving point for respectively receiving first and second pairs of signals respectively radiated by said first and second pairs of transmitters and for heterodyning said received signals in pairs to produce a first position indicating signal having a frequency representative of the beat frequency between said first pair of radiated signals and having a phase sensitivity determined by the average frequency of said first pair of radiated signals and to produce a beat frequency signal having a frequency representative of the beat frequency between said second pair of radiated signals, means for heterodyning said position indicating signal and said last mentioned beat frequency signal to produce a second position indicating signal having a frequency representative of the beat frequency between said first position indicating signal and said last mentioned beat frequency signal and having a phase sensitivity determined by the relative values of the respective average frequencies of said first and second pairs of radiated signals, means at said receiving point for receiving and reproducing said first and second reference signals, and phase measuring means for measuring the phase relationship between said first position indicating and reference signals to provide a position indication of one sensitivity and for measuring the phase relationship between said second position indicating and reference signals to provide a position indication of different sensitivity.

38. A position determining system comprising a pair of spaced transmitting units, a plurality of pairs of transmitters, each pair of transmitters including a transmitter at each of said units for radiating to a receiving point position indicating signals of different frequencies, first heterodyning means responsive to a pair of signals derived from a first pair of transmitters for producing a first reference signal having a frequency representative of the beat frequency between said pair of derived signals, other heterodyning means responsive to a second pair of signals derived from a second pair of transmitters for producing a beat frequency signal having a frequency representative of the beat frequency between said second pair of derived signals, heterodyne means controlled by said first reference signal and said beat frequency signal for producing a second reference signal having a frequency representative of the beat frequency between said first reference signal and said beat frequency signal, means for modulating said reference signals upon a common carrier for radiation to said receiving point, a pair of receivers at said receiving point for respectively receiving first and second pairs of signals respectively radiated by said first and second pairs of transmitters and for heterodyning said received signals in pairs to produce a first position indicating signal having a frequency representative of the beat frequency between said first pair of radiated signals and having a phase sensitivity determined by the average frequency of said first pair of radiated signals and to produce a beat frequency having a frequency representative of the beat frequency between said second pair of radiated signals, means for heterodyning said position indicating signal and said last mentioned beat frequency signal to produce a second position indicating signal having a frequency representative of the beat frequency between said first position indicating signal and said last mentioned beat frequency signal and having a phase sensitivity determined by the relative values of the respective average frequencies of said first and second pairs of radiated signals, means at said receiving point for receiving said common carrier and separately reproducing said first and second reference signals, and phase measuring means for measuring the phase relationship between said first position indicating and reference signals to provide a position indication of one sensitivity and for measuring the phase relationship between said second position indicating and reference signals to provide a position indication of different sensitivity.

39. A position determining system comprising three spaced transmitting units each of which includes a plurality of transmitters for radiating to a receiving point position indicating signals of different frequencies, heterodyning means responsive to signals derived from one of said transmitters at each of said units for producing a first pair of beat frequency signals having frequencies respectively representative of the beat frequencies between signals radiated from a first one of said units and from each of the second and third ones of said units, heterodyning means responsive to signals derived from others of said transmitters at said units for heterodyning said last mentioned signals in pairs to produce a second pair of beat frequency signals having frequencies respectively representative of beat frequencies between different pairs of signals radiated by transmitters at said one unit and at a second of said units and to produce a third pair of beat frequency signals having frequencies respectively representative of beat frequencies between different pairs of signals radiated by transmitters at said one unit and at a third of said units, means controlled by one beat frequency signal of said first pair and by said second pair of beat frequency signals for producing a first pair of reference signals, means controlled by the other beat frequency signal of said first pair and by said third pair of beat frequency signals for producing a second pair of reference signals, means for modulating all of said reference signals on a carrier for radiation to said receiving point, a wave signal receiver at said receiving point for receiving signals radiated from said first transmitter at each of said units and heterodyning said signals in pairs to produce a first pair of beat frequency signals having frequencies respectively representative of the beat frequencies between pairs of signals radiated from said first and second units and said first and third units and having phase sensitivities determined by the average frequencies of the radiated pairs of signals, other wave signal receiving means at said receiving point for receiving a plurality of other signals radiated from said other transmitters at said units and for heterodyning said other signals in pairs to produce a second pair of beat frequency signals having frequencies respectively representative of the beat frequencies between pairs of said other signals from said first and second units and having phase sensitivities respectively determined by the respective average frequencies of said pairs of other signals, and to produce a third pair of beat frequency signals having frequencies respectively representative of the beat frequencies between pairs of said other signals from said first and third units and having phase sensitivities respectively determined by the respective average frequencies of said last mentioned pairs of other signals, means controlled by one of said first pair of beat frequency signals and by said second pair of beat frequency signals to produce a first pair of position indicating signals having frequencies respectively representative of the beat frequencies between said one of said first pair and said second pair of beat frequency signals and having phase sensitivities respectively determined by the relative average values of the frequencies of the pairs of radiated signals from which said one of said first pair and said second pair of beat frequency signals are derived, means controlled by the other one of said first pair of beat frequency signals and by said third pair of beat frequency signals to produce a second pair of position indicating signals having frequencies respectively representative of the beat frequencies between said other of said first pair and said third pair of beat frequency signals and having phase sensitivities respectively determined by the relative average values of the frequencies of the pairs of radiated signals from which said other of said first pair and said third pair of beat frequency signals are derived, means at said receiving point for receiving said modulated carrier and for reproducing all of said reference signals, phase measuring means for respectively measuring the phase relationship between the corresponding ones of said first pairs of position indicating and reference signals to provide two indications of different sensitivity of the position of said receiving point relative to said second transmitting unit, and other phase measuring means for respectively measuring the phase relationship between the corresponding ones of said second pairs of position indicating and reference signals to provide two indications of different sensitivity of the position of said receiving point relative to said third transmitting unit.

40. A position determining system comprising a plurality of position signal transmitters for radiating position indicating signals, a link transmitter including means responsive to said position indicating signals for producing a plurality of reference signals and means for radiating said reference signals, receiving and translating apparatus for receiving said position indicating and reference signals and producing a pair of position indications having phase sensitivities respectively determined by the sum of and the difference between the respective average frequencies of the pairs of position indicating signals from which the position indications are derived, the frequencies of said position indicating signals being so related as to provide the same ratio between said sum and difference frequencies as is provided between the frequencies of the corresponding reference signals.

41. A position determining system comprising a plurality of position signal transmitters for radiating position indicating signals, a link transmitter including means responsive to said position indicating signals for producing a plurality of reference signals and means for radiating said reference signals, receiving and translating apparatus for receiving said position indicating and reference signals and phase comparing said signals to provide position indications representative of a pair of hyperbolic patterns in which the iso-phase lines are respectively spaced apart distances corresponding to frequencies equal to the sum of and the difference between the respective average frequencies of the pairs of position indicating signals from which the respective patterns are derived, the frequencies of said position indicating signals being so related that the ratio of the reference signal frequency for the difference hyperbolas to the reference signal frequency for the sum hyperbolas is the same as the ratio between said sum and difference frequencies.

42. A wave signal transmission system comprising, a pair of spaced transmitting units, a plurality of pairs of transmitters for radiating signals of different frequencies, said transmitters of each pair being respectively disposed at different transmitting units, a plurality of heterodyning means respectively responsive to pairs of signals derived from said pairs of transmitters to produce beat frequency signals having frequencies respectively representative of the beat frequencies between the pairs of signals radiated by said pairs of transmitters, and other heterodyning means responsive to said beat frequency signals for producing at least one beat frequency reference signal having a frequency representative of the beat frequency between at least one pair of said first mentioned beat frequency signals, said transmitting units being spaced apart a distance less than one half the wave length of a wave having a frequency equal to the difference between the average frequencies of the signals respectively radiated by at least two of said pairs of transmitters.

43. A wave signal transmission system comprising, a pair of spaced transmitting units, a plurality of pairs of transmitters for radiating signals of different frequencies, said transmitters of each pair being respectively disposed at different transmitting units, a plurality of heterodyning means respectively responsive to pairs of signals derived from said pairs of transmitters to produce beat frequency signals having frequencies respectively representative of the beat frequencies between the pairs of signals radiated by said pairs of transmitters, other heterodyning means responsive to said beat frequency signals for producing at least one beat frequency reference signal having a frequency representative of the beat frequency between at least one pair of said first mentioned beat frequency signals, and means for modulating said reference signal upon a carrier for space radiation, said transmitting units being spaced apart a distance less than one half the wave length of a wave having a frequency equal to the difference between the average frequencies of the signals respectively radiated by at least two of said pairs of transmitters.

44. A wave signal transmission system comprising a pair of spaced transmitting units, a first pair of transmitters including a transmitter at each of said units for radiating a first pair of signals at different frequencies, a second pair of transmitters including a transmitter at each of said units for radiating a second pair of signals at different frequencies, each of said transmitters at one of said units radiating signals of higher frequency than the transmitter of that pair at the other of said units, a pair of heterodyning means respectively responsive to said pairs of signals to produce a pair of beat frequency signals having frequencies respectively representative of the beat frequencies between the signals of said first pair and between the signals of said second pair, and other heterodyning means responsive to said pair of beat frequency signals for producing a reference signal representative of the beat frequency between said pair of beat frequency signals, said transmitting units being spaced apart a distance less than one half of the wave length of a wave having a frequency equal to the difference between the average frequency of the said first pair of signals radiated by said first pair of transmitters and the average frequency of the said second pair of signals radiated by said second pair of transmitters.

45. A wave signal transmission system comprising a pair of spaced transmitting units, a first pair of transmitters including a transmitter at each of said units for radiating a first pair of signals at different frequencies, a second pair of transmitters including a transmitter at each of said units for radiating a second pair of signals at different frequencies, each of said transmitters at one of said units radiating signals of higher frequency than the transmitter of that pair at the other of said units, a pair of heterodyning means respectively responsive to said pairs of signals to produce a pair of beat frequency signals having frequencies respectively representative of the beat frequencies between the signals of said first pair and between the signals of said second pair, other heterodyning means responsive to said pair of beat frequency signals for producing a reference signal representative of the beat frequency between said pair of beat frequency signals, and means for modulating said reference signal upon a carrier for space radiation, said transmitting units being spaced apart a distance less than one half of the wave length of a wave having a frequency equal to the difference between the average frequency of the said first pair of signals radiated by said first pair of transmitters and the average frequency of the said second pair of signals radiated by said second pair of transmitters.

46. A wave signal transmission system comprising a pair of spaced transmitting units, three pairs of transmitters for radiating pairs of signals of different frequencies, one transmitter of each pair being disposed at one of said units and the other transmitter of each pair being disposed at the other of said units, first heterodyning means responsive to a first pair of said signals for producing a first reference signal having a frequency representative of the beat frequency between the signals of said first pair, other heterodyning means responsive to a second and a third pair of said signals to produce a pair of beat frequency signals having frequencies respectively representative of the beat frequencies between the signals of said second pair and between the signals of said third pair, means controlled by said first reference signal and one of said beat freqeuncy signals to produce a second reference signal, and means controlled by said first reference signal and the other of said beat frequency signals to produce a third reference signal, said transmitting units being spaced apart a distance less than one half the wave length of a wave having a frequency equal to the difference between the average frequencies of the signals respectively radiated by at least two of said pairs of transmitters.

47. A position determining system comprising a pair of spaced transmitting units, a plurality of pairs of transmitters, each pair of transmitters including a transmitter at each of said units for radiating to a receiving point position indicating signals of different frequencies, heterodyning means responsive to signals derived from said pairs of transmitters for heterodyning said signals in pairs to produce a pair of beat frequency signals and for heterodyning said pair of beat frequency signals to produce a reference signal having a frequency representative of the beat frequency between said beat frequency signals, means for modulating said reference signal upon a carrier for radiation to said receiving point, said transmitting units being spaced apart a distance less than one half the wave length of a wave having a frequency equal to the difference between the average frequencies of the signals respectively radiated by at least two of said pairs of transmitters, a pair of receivers at said receiving point for respectively receiving said pairs of signals radiated by said pairs of transmitters and for heterodyning said received signals in pairs to produce a pair of beat frequency signals having frequencies representative of the respective beat frequencies between the signals of said pairs of received signals and having phase sensitivities respectively determined by the values of the average frequencies of the pairs of received signals from which they are derived, heterodyning means at said receiving point responsive to said last mentioned beat frequency signals for producing a position indicating heterodyne signal having a frequency representative of the beat frequency between said last mentioned beat frequency signals and having a phase sensitivity determined by the relative values of the respective average frequencies of the pairs of radiated signals from which said last mentioned beat frequency signals are derived, means at said receiving point for receiving said reference signal modulated carrier and for producing a reference signal having a frequency equal to the frequency of said position indicating signal, and phase measuring means for measuring the phase relationship between said position indicating and reference signals.

48. A position determining system comprising a pair of spaced transmitting units, a plurality of pairs of transmitters, each pair of transmitters including a transmitter at each of said units for radiating to a receiving point position indicating signals of different frequencies, heterodyning means responsive to signals derived from said pairs of transmitters for heterodyning said signals in pairs to produce a pair of beat frequency signals and for heterodyning said pair of beat frequency signals to produce a reference signal having a frequency representative of the beat frequency between said beat frequency signals, means for modulating said reference signal upon a carrier for radiation to said receiving point, said transmitting units being spaced apart a distance less than one half the wave length of a wave having a frequency equal to the difference between the average frequencies of the signals respectively radiated by at least two of said pairs of transmitters, a pair of receivers at said receiving point for respectively receiving said pairs of signals radiated by said pairs of transmitters and for heterodyning said received signals in pairs to produce a pair of beat frequency signals having frequencies representative of the respective beat frequencies between the signals of said pairs of received signals and having phase sensitivities respectively determined by the values of the average frequencies of the pairs of received signals from which they are derived, heterodyning means at said receiving point responsive to said last mentioned beat frequency signals for producing a position indicating heterodyne signal having a frequency representative of the beat frequency between said last mentioned beat frequency signals and having a phase snsitivity determined by the difference between the respective average frequencies of the pairs of radiated signals from which said last mentioned beat frequency signals are derived, means at said receiving point for receiving said reference signal modulated carrier and producing a reference signal having a frequency equal to the frequency of said position indicating signal, and phase measuring means for measuring the phase relationship between said position indicating and reference signals.

49. A position determining system comprising, a pair of spaced transmitting units, a plurality of pairs of transmitters, each pair of transmitters including a transmitter at each of said units for radiating to a receiving point position indicating signals of different frequencies, the transmitters at one of said units radiating signals of higher frequency than the transmitters of the corresponding pairs at the other of said units, heterodyning means responsive to signals derived from said pairs of transmitters for heterodyning said signals in pairs to produce a pair of beat frequency signals and for heterodyning said pair of beat frequency signals to produce a reference signal having a frequency representative of the beat frequency between said beat frequency signals, means for modulating said reference signal upon a carrier for radiation to said receiving point, said transmitting units being spaced apart a distance less than one half the wave length of a wave having a frequency equal to the difference between the average frequencies of the signals respectively radiated by at least two of said pairs of transmitters, a pair of receivers at said receiving point for respectively receiving said pairs of signals radiated by said pairs of transmitters and for heterodyning said received signals in pairs to produce a pair of beat frequency signals having frequencies representative of the respective beat frequencies between the signals of said pairs of received signals and having phase sensitivities respectively determined by the values of the average frequencies of the pairs of received signals from which they are derived, heterodyning means at said receiving point responsive to said last mentioned beat frequency signals for producing a position indicating heterodyne signal having a frequency representative of the beat frequency between said last mentioned beat frequency signals and having a phase sensitivity determined by the difference between the respective average frequencies of the pairs of radiated signals from which said last mentioned beat frequency signals are derived, means at said receiving point for receiving said reference signal modulated carrier and producing a reference signal having a frequency equal to the frequency of said position indicating signal, and phase measuring means for measuring the phase relationship between said position indicating and reference signals.

JAMES E. HAWKINS.

No references cited.